(12) United States Patent  (10) Patent No.: US 8,978,923 B2
George                                (45) Date of Patent:   Mar. 17, 2015

(54) BEVERAGE CONTAINER CLOSURE WITH VENTING

(75) Inventor: Sarah Danger George, Vashon, WA (US)

(73) Assignee: Pacific Market International, LLC, Seattle, WA (US)

( * ) Notice: Subject to any disclaimer, the term of this patent is extended or adjusted under 35 U.S.C. 154(b) by 581 days.

(21) Appl. No.: 13/311,373

(22) Filed: Dec. 5, 2011

(65) Prior Publication Data

US 2013/0140309 A1  Jun. 6, 2013

(51) Int. Cl.
  *B65D 51/18* (2006.01)

(52) U.S. Cl.
  USPC .......................................... 220/715; 215/311

(58) Field of Classification Search
  CPC .............................. A47G 19/2272; B65D 51/18
  USPC .......... 220/711, 713, 714, 715, 719; 215/307, 215/311, 315, 387
  See application file for complete search history.

(56) References Cited

U.S. PATENT DOCUMENTS

| 118,860 | A | 9/1871 | Kent |
| 404,192 | A | 5/1889 | Haas |
| 421,282 | A | 2/1890 | Jackson |
| 599,389 | A | 2/1898 | Jackson |
| 656,000 | A | 8/1900 | Wall |
| 657,636 | A | 9/1900 | Bingham |
| 768,355 | A | 8/1904 | Bolen |
| 2,210,206 | A | 8/1940 | Fisher |
| 2,274,849 | A | 3/1942 | Peterson |
| 2,447,870 | A | 8/1948 | Polcyn |
| 2,884,157 | A | 4/1959 | Lampkin |
| 3,059,816 | A | 10/1962 | Goldstein |
| 3,739,938 | A | 6/1973 | Paz |
| 3,964,631 | A | * 6/1976 | Albert ........................... 220/715 |
| 3,967,748 | A | 7/1976 | Albert |

(Continued)

FOREIGN PATENT DOCUMENTS

| DE | 3402894 | 8/1985 |
| DE | 20003371 | 4/2000 |

(Continued)

OTHER PUBLICATIONS

U.S. Appl. No. 12/946,501, filed Nov. 15, 2010, Gilbert et al.

(Continued)

*Primary Examiner* — Steven A. Reynolds
*Assistant Examiner* — King M Chu
(74) *Attorney, Agent, or Firm* — Davis Wright Tremaine LLP; George C. Rondeau, Jr.

(57) ABSTRACT

A beverage container closure or lid adapted for closing an open end of a beverage container. The lid is couplable to the beverage container and includes a selectively openable stopper that when closed, creates a fluid-tight seal between the beverage container and the environment. The stopper may be opened by pressing a button disposed on a side of the beverage container closure. The stopper is subsequently automatically closed when the button is released. Thus, the user may open and close the beverage container closure using a single hand without the need to remove the beverage container closure from the beverage container. The beverage container closure includes an actuating lever configured to press the button when a user applies a force to the lever. By utilizing the mechanical advantage provided by the lever, a user is able to selectively open and close the stopper using a relatively low amount of force.

20 Claims, 19 Drawing Sheets

(56) References Cited

U.S. PATENT DOCUMENTS

| | | | |
|---|---|---|---|
| 3,972,443 A | 8/1976 | Albert | |
| 4,094,433 A | 6/1978 | Numbers | |
| 4,099,642 A | 7/1978 | Nergard | |
| 4,136,799 A | 1/1979 | Albert | |
| 4,212,408 A | 7/1980 | Valenzona | |
| 4,276,992 A | 7/1981 | Susich | |
| 4,303,173 A | 12/1981 | Nergard | |
| 4,676,411 A | 6/1987 | Simasaki | |
| 4,834,270 A | 5/1989 | Messner | |
| 5,427,271 A | 6/1995 | Wang | |
| 5,485,938 A | 1/1996 | Boersma | |
| 5,495,966 A | 3/1996 | Won | |
| 5,615,808 A | 4/1997 | Huang | |
| 5,918,854 A | 7/1999 | Barrash et al. | |
| 5,944,235 A | 8/1999 | Won | |
| 6,098,834 A * | 8/2000 | Hatsumoto et al. | 220/715 |
| 6,116,476 A | 9/2000 | Huang | |
| 6,626,314 B1 | 9/2003 | McHenry et al. | |
| 6,763,964 B1 | 7/2004 | Hurlbut et al. | |
| 7,413,096 B2 | 8/2008 | Morgan et al. | |
| 7,546,933 B2 | 6/2009 | Pinelli | |
| 7,997,442 B2 | 8/2011 | Pinelli | |
| 8,297,462 B1 | 10/2012 | Joyce | |
| 8,376,162 B2 | 2/2013 | Yang | |
| 2002/0033400 A1 | 3/2002 | Rohrer et al. | |
| 2004/0040962 A1 | 3/2004 | Bielecki et al. | |
| 2004/0217139 A1 | 11/2004 | Roth et al. | |
| 2005/0029265 A1 | 2/2005 | Morgan et al. | |
| 2006/0096983 A1 | 5/2006 | Patterson | |
| 2006/0175331 A1 * | 8/2006 | Lin et al. | 220/254.5 |
| 2006/0226160 A1 * | 10/2006 | Elsaden et al. | 220/715 |
| 2007/0210093 A1 * | 9/2007 | Pinelli | 220/715 |
| 2008/0156817 A1 * | 7/2008 | Roseblade et al. | 220/713 |
| 2008/0237233 A1 * | 10/2008 | Choi et al. | 220/212.5 |
| 2008/0272134 A1 * | 11/2008 | Rohe | 220/713 |
| 2011/0132908 A1 * | 6/2011 | Meehan | 220/254.3 |
| 2011/0309095 A1 * | 12/2011 | Pinelli | 220/715 |
| 2013/0140309 A1 * | 6/2013 | George | 220/254.1 |

FOREIGN PATENT DOCUMENTS

| | | |
|---|---|---|
| DE | 202011002273 | 4/2011 |
| JP | 09-150852 | 6/1997 |
| JP | 2009-279332 | 12/2009 |
| KR | 20-1998-0061202 | 11/1998 |
| WO | 0034143 | 6/2000 |

OTHER PUBLICATIONS

U.S. Appl. No. 12/847,028, filed Jul. 30, 2010, Wahl et al.
U.S. Appl. No. 13/169,249, filed Jun. 27, 2011, Gilbert et al.
U.S. Appl. No. 13/226,669, filed Sep. 7, 2011, Shepard et al.
European search report for Application No. EP12173632 dated Oct. 18, 2012.
U.S. Appl. No. 13/226,669, filed Sep. 7, 2011, Shepard.

* cited by examiner

BEVERAGE CONTAINER CLOSURE WITH VENTING

BACKGROUND OF THE INVENTION

1. Field of the Invention

The present invention is directed generally to lids for liquid storage vessels such as for beverage or food containers and more particularly to lids with movable components that include an actuating lever and pressure-venting features.

2. Description of the Related Art

Prior art lids are typically of one of three types. The first type is a solid unitary lid that does not include openings or apertures through which the contents of a liquid storage vessel may exit the vessel. To drink from the vessel, a user must remove the lid. The second type, which may also be of a unitary construction, includes one or more unobstructed apertures through which the liquid may exit the vessel. In the second type, the apertures are always open. If the vessel is inadvertently tipped or dropped, the contents of the vessel may spill. The third type of lid includes one or more apertures through which the liquid may exit the vessel and a means for selectively opening and closing the apertures. When using the third type of lid, the user may selectively open the apertures to remove the contents from the vessel and selectively close the apertures to maintain the contents inside the vessel. Further, by closing the apertures, the lid may help insulate the contents from the environment outside the vessel.

DETAILED DESCRIPTION OF THE INVENTION

Overview

Embodiments of the present invention are directed to beverage container closures or lids that are adapted for closing an open end of a beverage container. The lids are selectively couplable to the beverage container and include a selectively openable stopper that when closed, creates a fluid-tight seal between the beverage container and the environment. A user pressing a button disposed on a side of the beverage container closure may selectively open the stopper. The stopper is subsequently automatically closed when the user releases the button. Thus, the user may open and close the beverage container closure using a single hand without the need to remove the beverage container closure from the beverage container.

The beverage container closures described herein include an actuating lever configured to press the button when a user applies an inward force to the lever. By utilizing the mechanical advantage provided by the lever, a user is able to selectively open and close the stopper using a relatively low amount of hand force compared to directly pressing the button. This feature can be desirable for users that are not able or do not wish to use a relatively large amount of force to open the stopper of the beverage container closure by pressing directly on a relatively small button. The operation of the actuating lever is discussed below with reference primarily to FIGS. 8A, 8B, 8C, and 8D.

Embodiments of the present invention are also directed to systems and methods for providing pressure venting for a beverage container closure or lid. When a hot liquid such as coffee is stored in a closed beverage container, the pressure inside the beverage container builds. Due to this pressure, for some beverage containers there is a potential for liquid or gas to be expelled or spray from an opening in the beverage container when it is opened by a user (e.g., for drinking from the beverage container). Embodiments of the invention disclosed herein are also directed to venting mechanisms for beverage container closures that prevent the spray of liquid or gas from a drink hole or vent hole of beverage container closures when the beverage container closures are opened by a user (e.g., to drink a beverage therefrom). Initially, with reference to FIGS. 1-12, a beverage container closure or lid that includes an exemplary venting mechanism is described generally. Afterward, with reference to FIGS. 13A, 13B, 13C, and 13D, the venting mechanism of the beverage container closure is described in detail.

Beverage Container Closure

Figure 1:
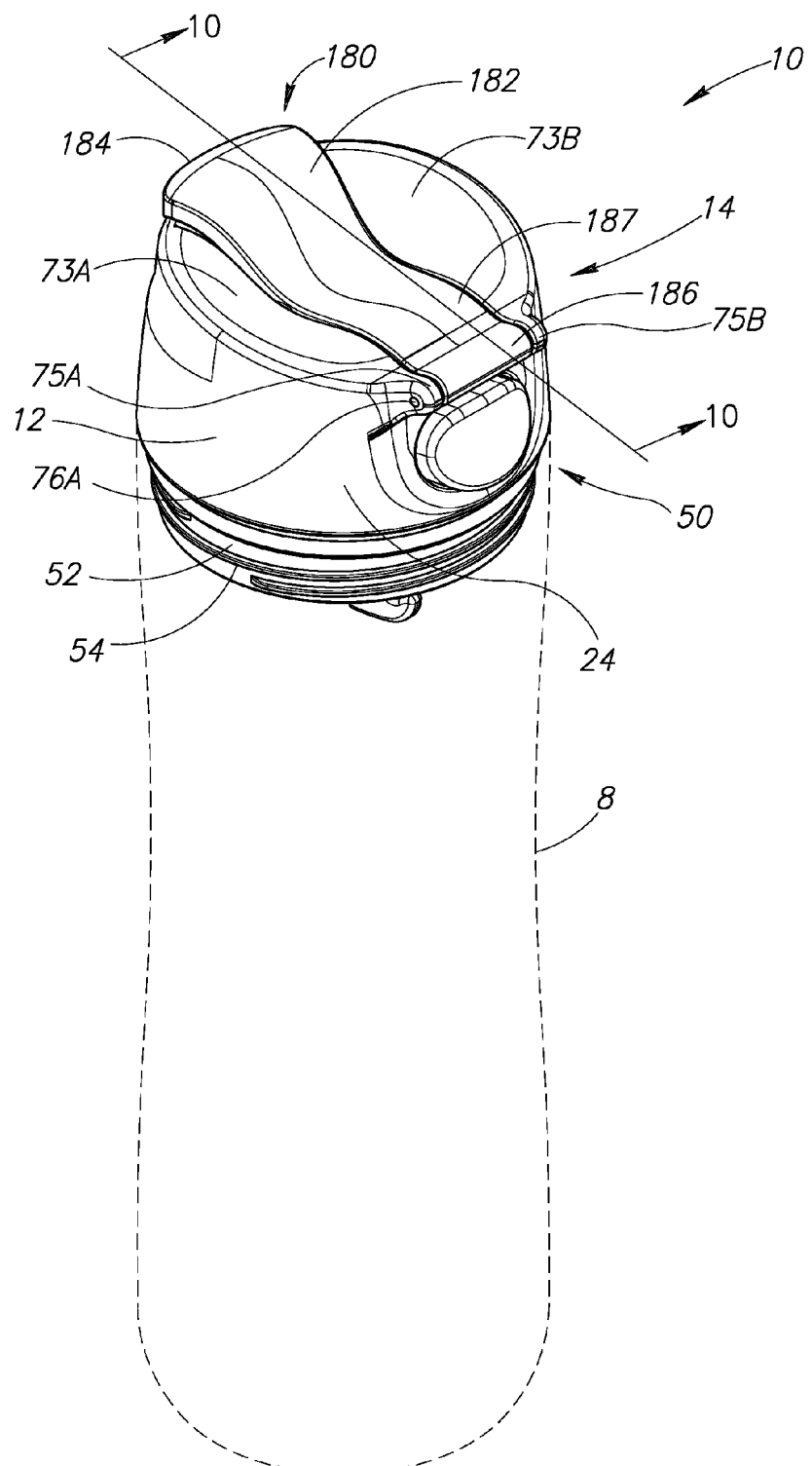
FIG. 1 is a top right side perspective view of a beverage container closure having a lever selectively disposed in a cover position to cover a drinking opening in the beverage container closure.

A beverage container closure or lid, in accordance with an embodiment of the present invention, is generally indicated by reference numeral 10 in FIG. 1. The lid 10 has a generally cylindrical main body 12 that is adapted for closing an open end of a conventional drinking vessel or beverage container 8 (shown in dashed lines for illustrative purposes). The beverage container 8 may be any suitable type of container such as the tumbler type (that is, without a handle) for use in automotive beverage receptacles, or for transport in backpacks, book bags, and the like. The lid 10 is selectively couplable to the beverage container 8 by any suitable means such as threads 54 disposed on an outer surface of a sidewall 52 of a lower, downwardly depending portion 50 of the main body 12. The lid 10 also includes a flexible O-ring seal member 56 (see FIG. 2) positioned adjacent the sidewall 52 of the lower portion 50 at a location near a bottom surface of an upper portion 14 of the main body 12. The particular configuration for mating the lid 10 to the container 8 is a matter of choice for one of ordinary skill in the art. Thus, although threads 54 and the seal member 56 have been shown in this embodiment, those of ordinary skill in the art will appreciate that any other means for attaching and sealing the lid 10 with respect to the beverage container 8 may be substituted.

Figure 8A:
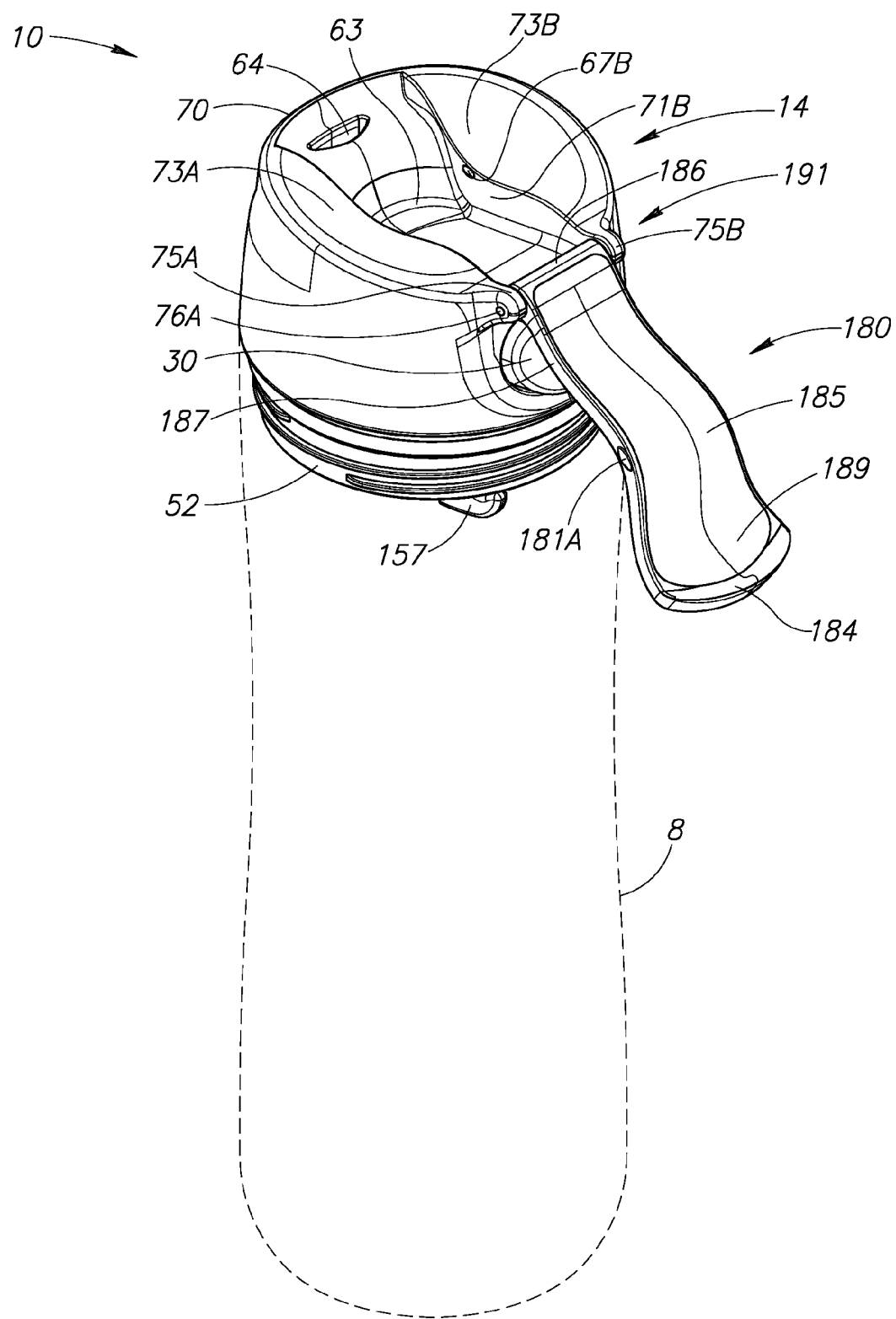
FIG. 8A is a top right side perspective view of the beverage container closure of FIG. 1 with the lever rotated away from the drinking opening and into an actuating position to provide a user with access to the drinking opening.
Figure 8B:
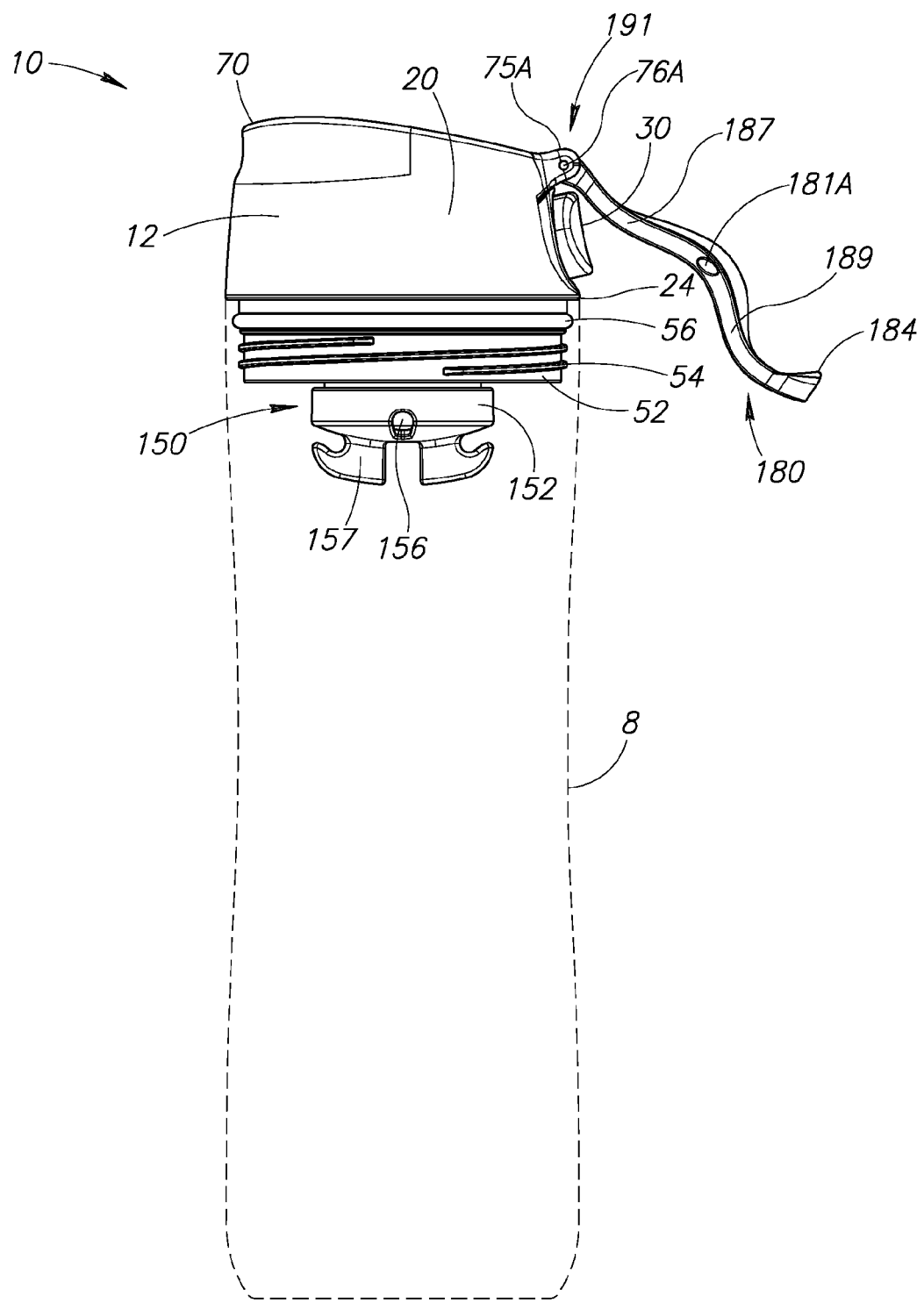
FIG. 8B is a right side elevational view of the beverage container as shown in FIG. 8A.

As best seen in FIG. 8A, the upper portion 14 of the main body 12 also includes a forward lip portion 70 configured for contact with a user's lips when the entire assembly is tipped toward the user, such that the user may drink from the beverage container 8 to which the lid 10 is attached. The upper portion 14 also includes an aperture or drinking opening 64 configured to permit fluid passage therethrough when a user drinks a beverage.

Figure 12:
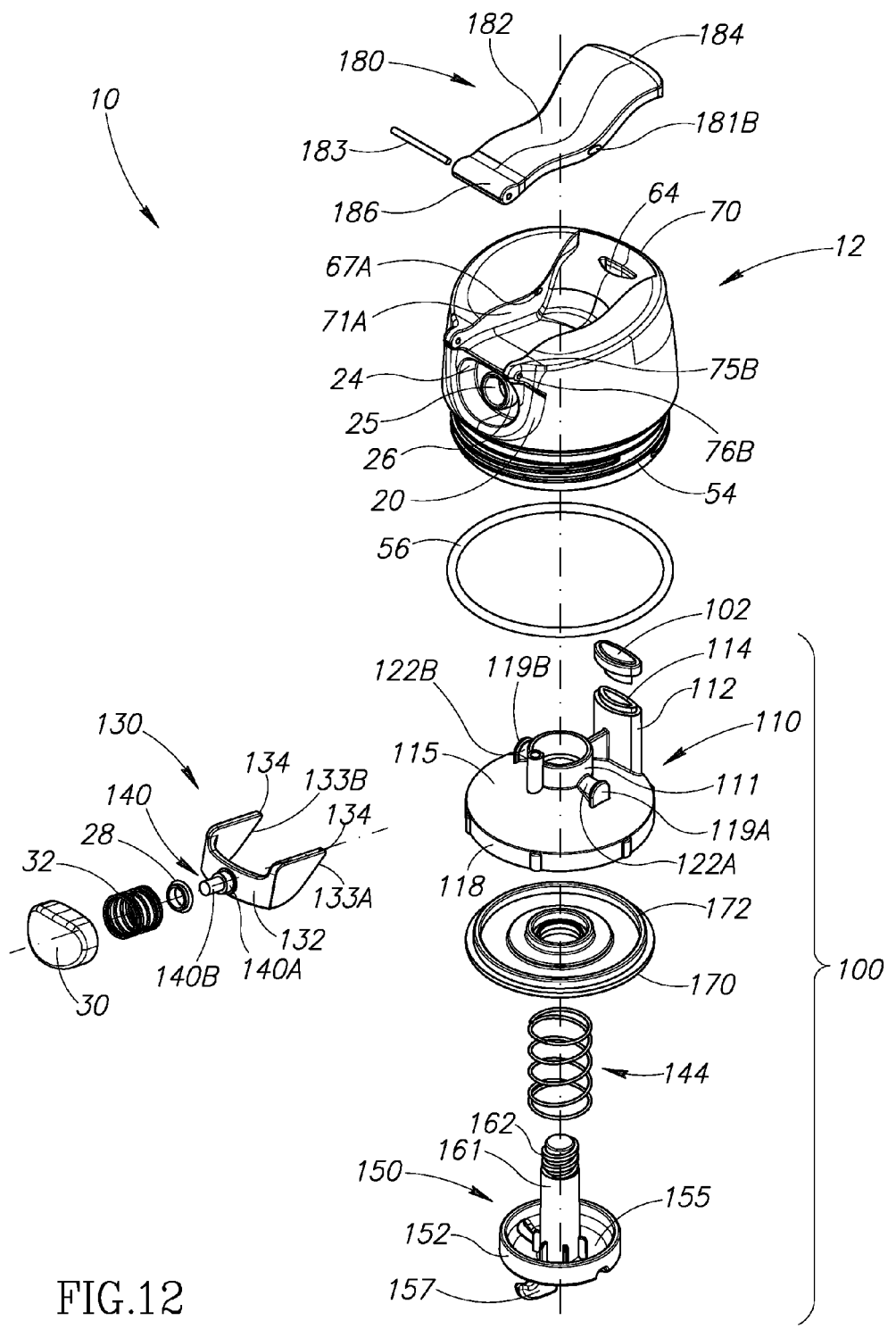
FIG. 12 is an enlarged, exploded perspective view of a stopper assembly of the beverage container closure of FIG. 1.

Fluid communication between the upper portion 14 and the interior of the beverage container 8 is controlled by way of a selectively openable stopper assembly 100, which may best be viewed in FIG. 12. The stopper assembly 100 includes a stopper 110 having a raised portion 112 configured for attachment of a stopper seal 102 thereto (e.g., by a press fit). The stopper seal 102 may be formed from a flexible material and is shaped to be positioned over a top surface 114 of the raised portion 112. Below the raised portion 112 of the stopper 110 is an angled base or body portion 115. Further, extending in a downward direction from the body portion 115 of the stopper 110 is a circumferential sidewall 118. The sidewall 118 is configured to engage a stopper cap 170.

The stopper 110 also comprises an upwardly extending cylindrical wall 111 (see FIGS. 10 and 12) sized to be slightly larger than a downwardly extending cylindrical wall 13 of the upper portion 14 of the main body 12, such that the walls 13 and 111 may move axially freely in telescoping fashion with respect to each other when the lid 10 is operated by a user as described below. The stopper 110 also includes a pair of spaced apart cam followers 119A and 119B having respective cam follower surfaces 122A and 122B (see FIGS. 12, 13B, 13C, and 13D) disposed on the base portion 115 of the stopper on opposing sides of the upwardly extending cylindrical wall 111. The functionality of the cam followers 119A and 119B is described herein below.

Figure 10:
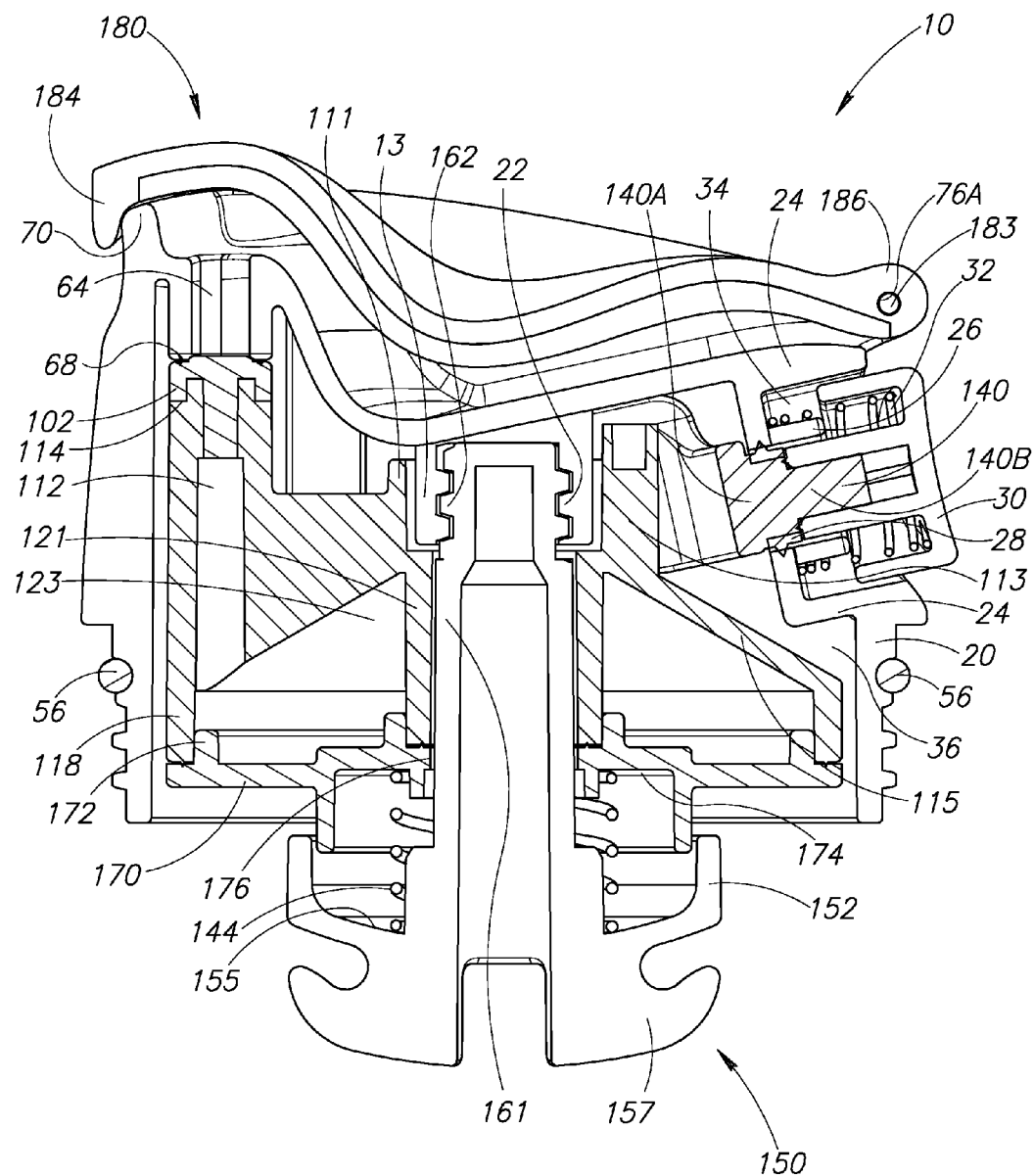
FIG. 10 is an enlarged cross-sectional right side elevational view of the beverage container closure of FIG. 1 taken substantially along the line 10-10 of FIG. 1.

As may best be viewed in FIG. 10, the stopper cap 170 includes a raised portion 172 configured to fit within the circumferential sidewall 118 of the stopper 110. The stopper cap 170 further includes an opening defined by an annular-shaped edge 176, and a bottom surface 174. These features are described below. When the stopper cap 170 is coupled to the stopper 110, an interior hollow region 123 is formed. To provide insulation between the interior of the beverage container 8 and the environment, an insulating substance, such as a ring of styrene, may be placed within the interior hollow region 123 of the stopper 110. The stopper cap 170 may be fixedly or removably coupled to the stopper 110.

The stopper assembly 100 also includes a stopper cover 150 (see FIGS. 10 and 12) configured for retaining the stopper assembly within a hollow interior region 36 of the main body 12. The stopper cover 150 includes a base portion 152 including multiple spaced apart apertures or openings 156 (see FIG. 3) disposed therein to allow for fluid passage therethrough. Further, the stopper cover 150 comprises an upwardly extending substantially cylindrically-shaped rod 161 terminating with an engagement portion 162 with external threads. As shown, the rod 161 passes through the opening defined by the annular-shaped edge 176 in the stopper cap 170, and through a downwardly extending cylindrical wall 121 of the stopper 110, where it is threadably engaged with an interiorly threaded stopper cover engagement portion 22 of the downwardly extending cylindrical wall 13 of the upper portion 14 of the main body 12, thereby securing the stopper cover 150 (and the other components of the stopper assembly 100) to the main body 12 of the lid 10. Stopper cover handles 157 are provided so a user can easily grip and rotate the stopper cover 150 to threadably engage the rod 161 with the stopper cover engagement portion 22.

As may best be viewed in FIG. 10, the stopper assembly 100 further includes a stopper biasing member 144 (in the illustrated embodiment, a spring) configured for biasing the stopper 110 upward into the closed position which provides a fluid-tight seal for the lid 10. The stopper biasing member 144 is sized to have a diameter that is slightly larger than the upwardly extending substantially cylindrically-shaped rod 161 of the stopper cover 150, such that the stopper biasing member may be positioned over the rod 161 and between a top surface 155 of the base portion 152 of the stopper cover 150 and an inner bottom surface 174 of the stopper cap 170 (see FIG. 10).

Figure 11A:
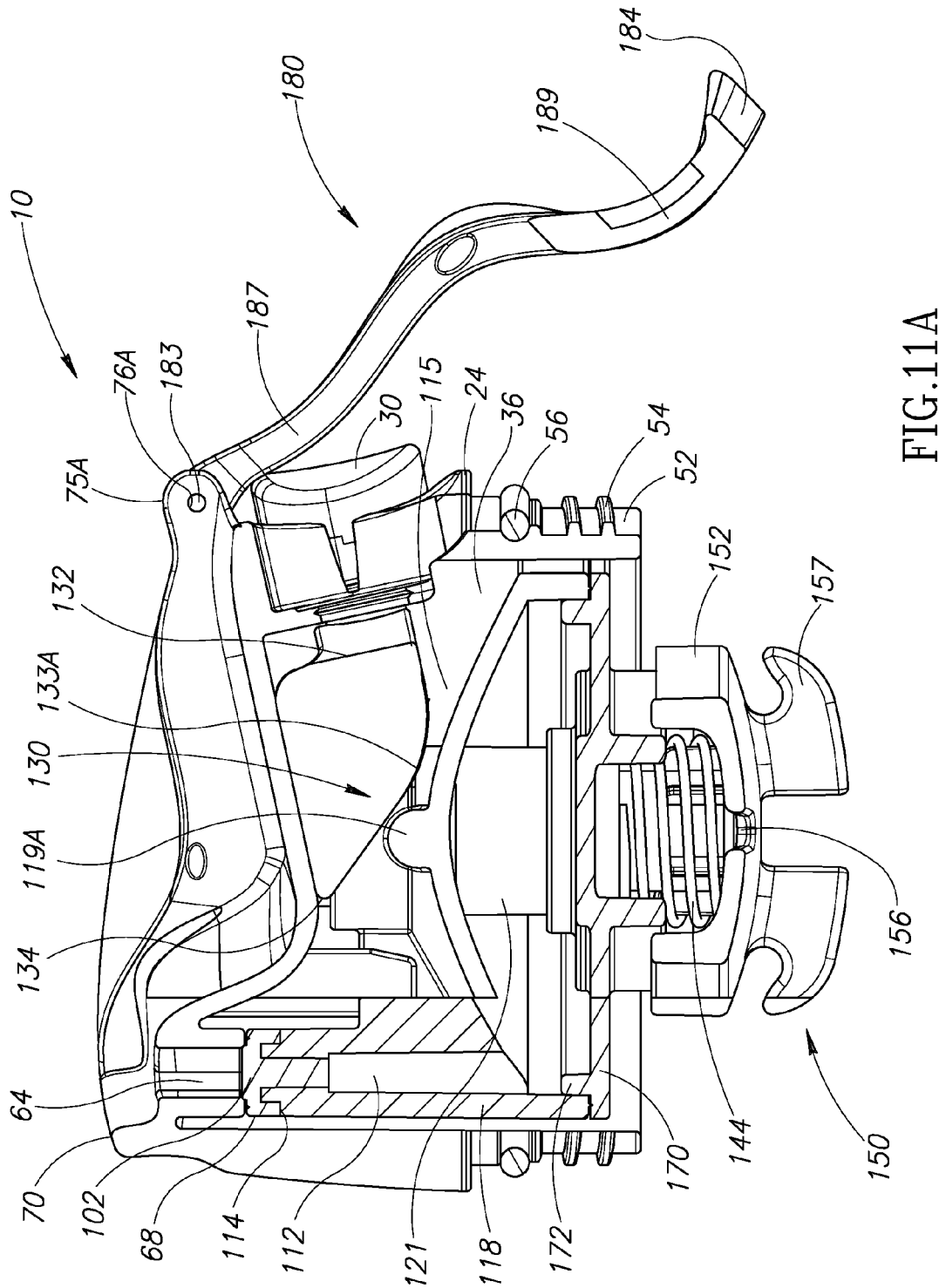
FIG. 11A is a sectional view taken substantially along the line 11A-11A of FIG. 9 with the stopper in the closed position.
Figure 11B:
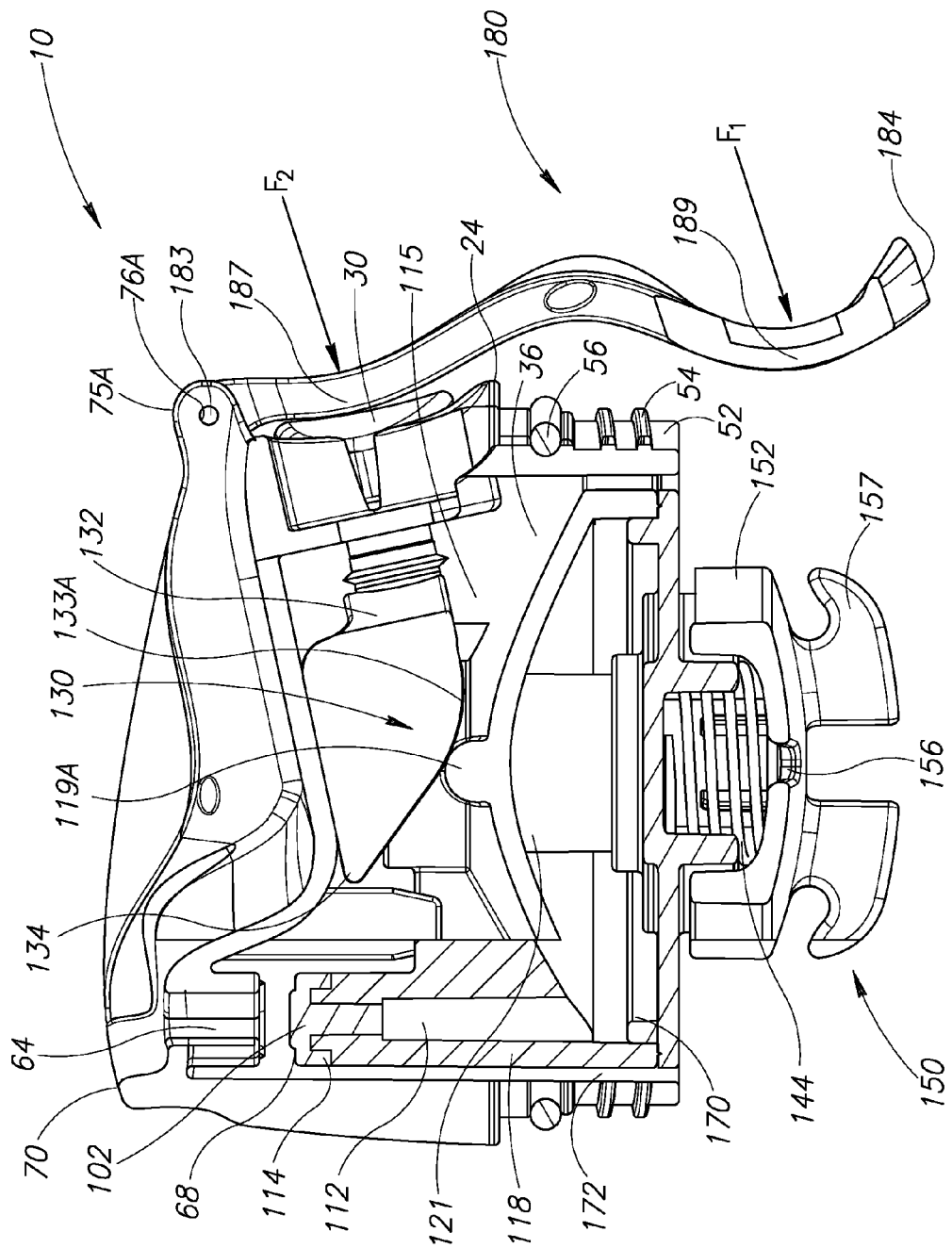
FIG. 11B is a sectional view taken substantially along the line 11B-11B of FIG. 9 with the stopper in the opened position.

As may best be viewed in FIGS. 11A, 11B, and 12, the stopper assembly 100 further includes an actuating member 130 configured for acting on the cam followers 119A and 119B of the stopper 110 to selectively move the stopper between the opened position and the closed position. The actuating member 130 includes first and second cam surfaces 133A and 133B (or "stopper engagement portions") spaced apart from each other and configured for slidable engagement with the first and second cam followers 119A and 119B (or "actuating member engagement portions"), respectively, of the stopper 110. The cam surfaces 133A and 133B are each ramp-shaped and are angled downward from a distal end 134 toward a proximal end 132 of the actuating member 130 (see FIGS. 11A and 11B). As described below, the cam surfaces 133A and 133B engage the surfaces of the cam followers 119A and 119B, respectively, to move the stopper 110 between the upward closed and lowered opened positions (shown in FIGS. 11A and 11B, respectively).

The actuating member 130 further includes a rod 140 (see FIG. 12) disposed at the proximal end 132 having a base portion 140A and a button coupling portion 140B. The button coupling portion 140B of the rod 140 is sized and shaped to be inserted (e.g., press fit) into a recessed portion of a button 30 (see FIG. 10) configured to permit a user to actuate the actuating member 130 by simply pressing the button inward or by applying a force to a lever 180 to press the button inward, as will be discussed below. Further, as discussed in detail below, a venting wiper seal member 28 (see FIGS. 10, 12, and 13B-D) is disposed around the base portion 140A of the rod 140.

The operation of the stopper assembly 100 is now described with reference to FIGS. 11A and 11B, which show cut-away right side elevational views of the lid 10 when the stopper 110 is in the sealed or closed position (FIG. 11A) and the opened position (FIG. 11B). As can be seen, the stopper assembly 100 is positioned within the hollow interior region 36 of the main body 12. The engagement portion 162 of the stopper cover 150 is engaged with the stopper cover engagement portion 22 of the downwardly extending cylindrical wall 13 of the upper portion 14 disposed in the hollow interior region 36 of the main body 12 (see FIG. 10). For example, the stopper cover 150 may be threadably engaged with the main body 12 to retain the stopper cover and the other components of the stopper assembly 100.

As shown in FIG. 11A, the stopper seal 102 is in sealing contact with the stopper seal engagement portion 68 that defines the drinking opening 64 of the main body 12. In this regard, when the stopper 110 is in the closed position shown in FIG. 11A, the stopper seal 102 is pressed against the stopper seal engagement portion 68 of the main body 12 by the biasing member 144 to provide a fluid-tight seal between the container 8 to which the lid 10 is attached and the environment.

The actuating member 130 is situated such that the first and second cam surfaces 133A and 133B are aligned over the first and second cam follower surfaces 122A and 122B of the cam followers 119A and 119B, respectively, of the stopper 110. The rod 140 of the actuating member 130 is situated within an actuating member opening 25 (also referred to as a "button tunnel") in a rear portion 20 (see FIGS. 10 and 12) of the main body 12 formed by a circumferential wall 26 (or actuating member opening wall). As shown in FIG. 10, the venting wiper seal member 28 is disposed around the base portion 140A of the rod 140 and inward of the circumferential wall 26 inside the button tunnel 25 to provide a fluid-tight seal between the environment and the hollow interior region 36 of the main body 12 when positioned in the button tunnel 25. In turn, the button 30 is coupled to the button coupling portion 140B of the rod 140 of the actuating member 130 (e.g., by a press fit) to allow a user to actuate the actuating member by pressing inward on the button, either directly or by pressing on the lever 180 as described below. A button biasing member 32 (e.g., a spring) is positioned over the circumferential wall 26 in a space 34 between the wall 26 and a surrounding outer wall 24 forming a recess in the rear portion 20 of the main body 12. The button biasing member 32 is operative to bias the button 30 and the actuating member 130 coupled thereto to the outward position shown in FIG. 11A which corresponds to the closed position of the stopper 110 and tends to move the actuating member 130 toward that position.

In operation, a user may cause the button 30 to be moved inward which in turn causes the actuating member 130 to be displaced in an inward, substantially horizontal direction (from the right to the left in the views shown in FIGS. 11A and 11B). As the actuating member 130 is displaced, the first and second cam surfaces 133A and 133B of the actuating member 130 slidably engage the surfaces 122A and 122B of the first and second cam followers 119A and 119B, respectively, of the stopper 110. Since the first and second cam surfaces 133A and 133B each slope downward from the distal end 134 toward the proximal end 132 of the actuating member 130, the surfaces of the first and second cam followers 119A and 119B (and thus the stopper 110) are moved in a downward direction as the actuating member 130 is displaced inward, as shown in FIG. 11B.

As the stopper 110 is moved in a downward direction, a gap 38 (see FIG. 11B) is formed between the stopper seal 102 and the stopper seal engagement portion 68 of the main body 12 such that fluid may pass through the drinking opening 64. Additionally, as the actuating member 130 is displaced inward, the wiper seal member 28 exits the button tunnel 25, which provides a passage between the outer environment and the hollow interior portion 36 of the main body 12. The timing of the operation of the sealing members 28, 102, and 117 is discussed below in the section describing the venting mechanism.

It should be appreciated that although in this embodiment the actuating member 130 includes the cam surfaces 133A and 133B and the stopper 110 includes the cam followers 119A and 119B, in other embodiments the actuating member 130 may include one or more cam followers and the stopper 110 may include one or more corresponding cam surfaces.

Actuating Lever

As discussed above, the lid 10 also comprises the selectively rotatable, exterior actuating lever 180 pivotally engaged with the upper portion 14 of the main body 12. In some embodiments, the lever 180 is selectively rotatable between a cover position (see FIGS. 1-7) and an actuating position (see FIGS. 8A-D). In other embodiments, the lever 180 may be pivotally coupled to the main body 12 but is not movable into a position wherein it covers the drinking opening 64. The lever 180 includes, an upper surface 182 (facing upward when in the cover position, and laterally inward in the actuating position), a bottom surface 185 (facing downward when in the cover position, but laterally outward in the actuating position, see FIG. 8A), a forward portion 184, and a lid coupling portion 186. The lid coupling portion 186 is configured to receive a pin 183 through an aperture that extends between lever coupling portions 75A and 75B of the lid 10. The pin 183 also extends through apertures 76A and 76B in the lever coupling portions 75A and 75B, respectively, to form a hinge 191 (see FIGS. 8A-8D) between the lid 10 and the lever 180.

Figure 2:
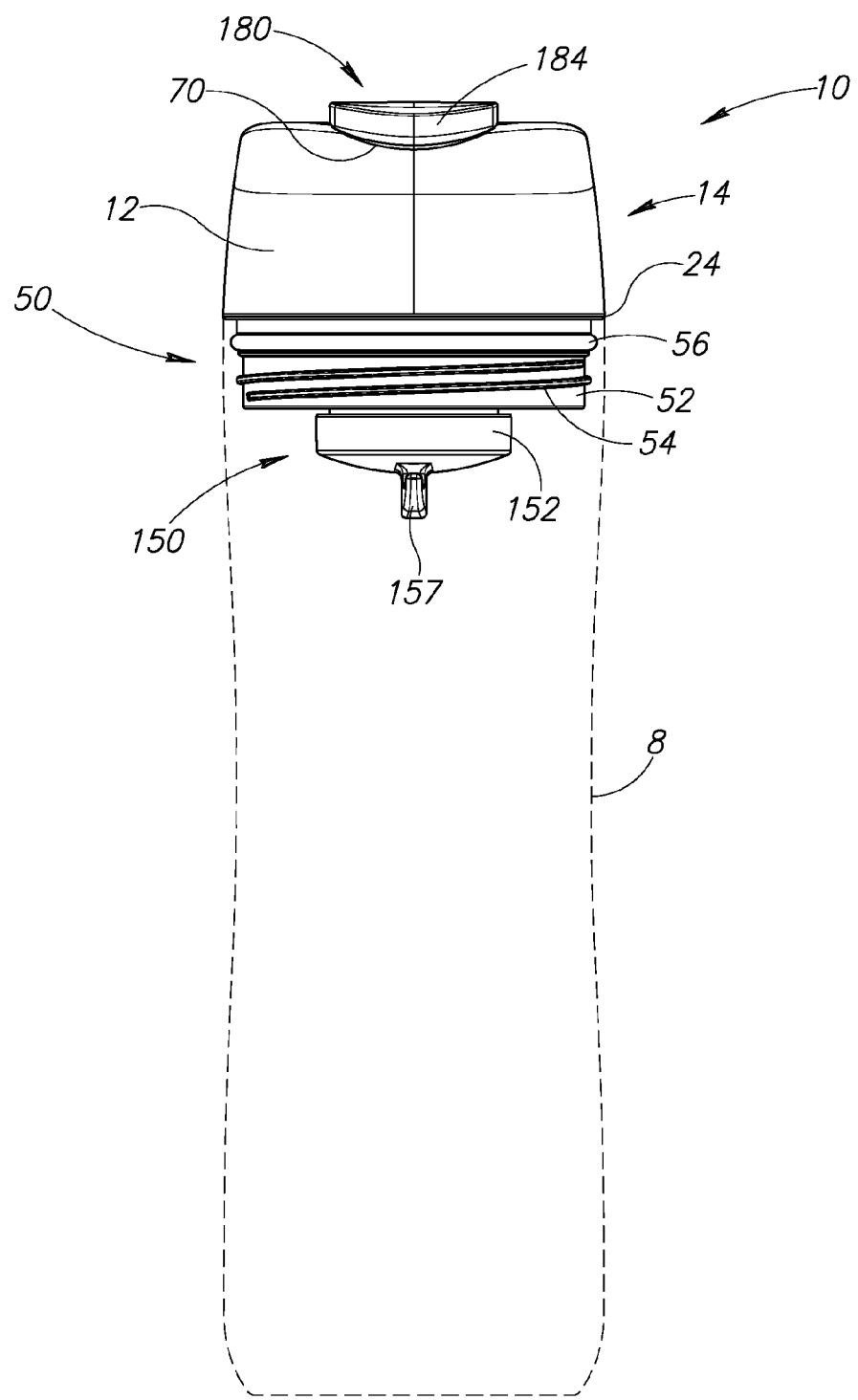
FIG. 2 is a front elevational view of the beverage container closure of FIG. 1.
Figure 3:
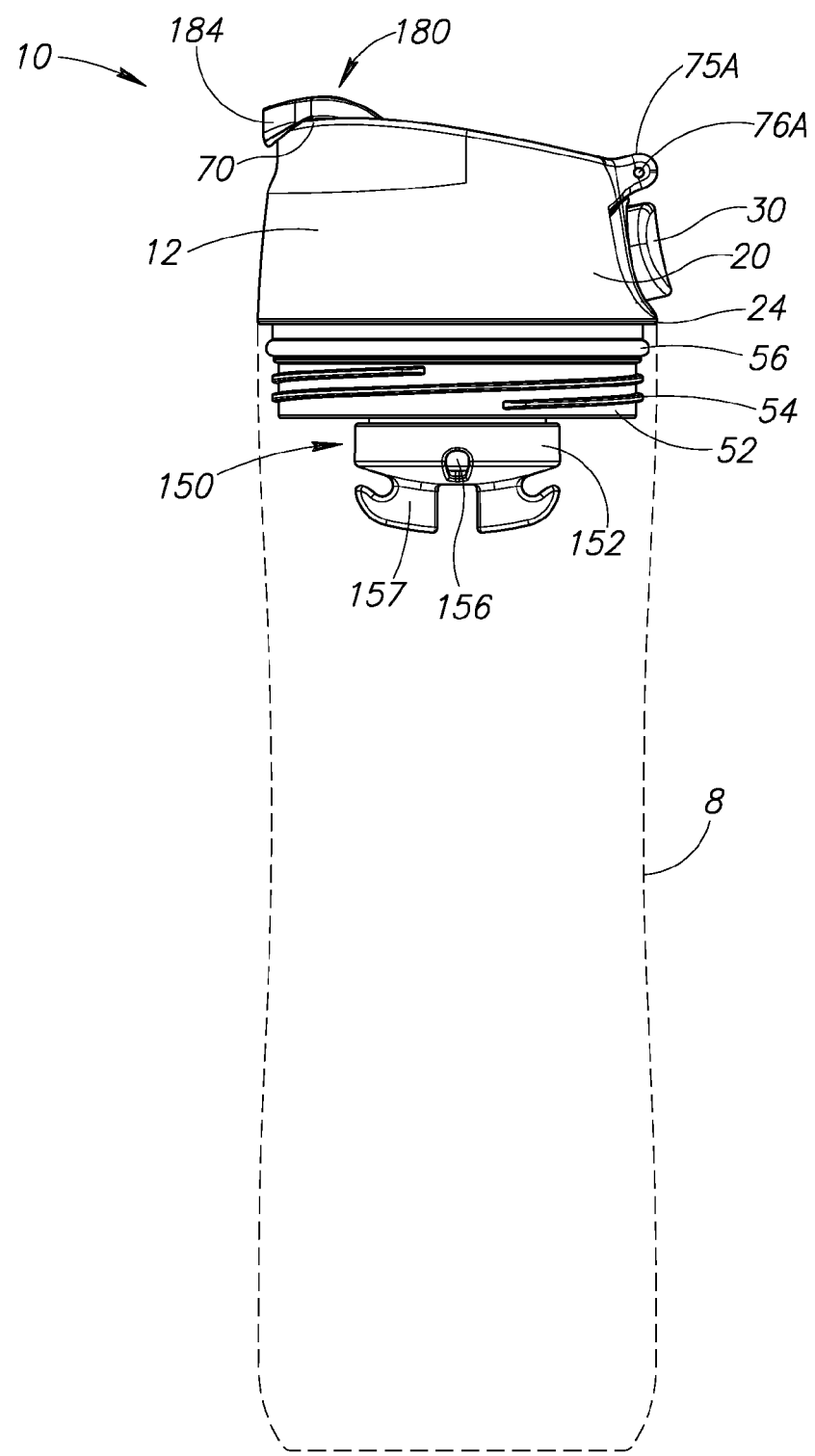
FIG. 3 is a right side elevational view of the beverage container closure of FIG. 1.
Figure 4:
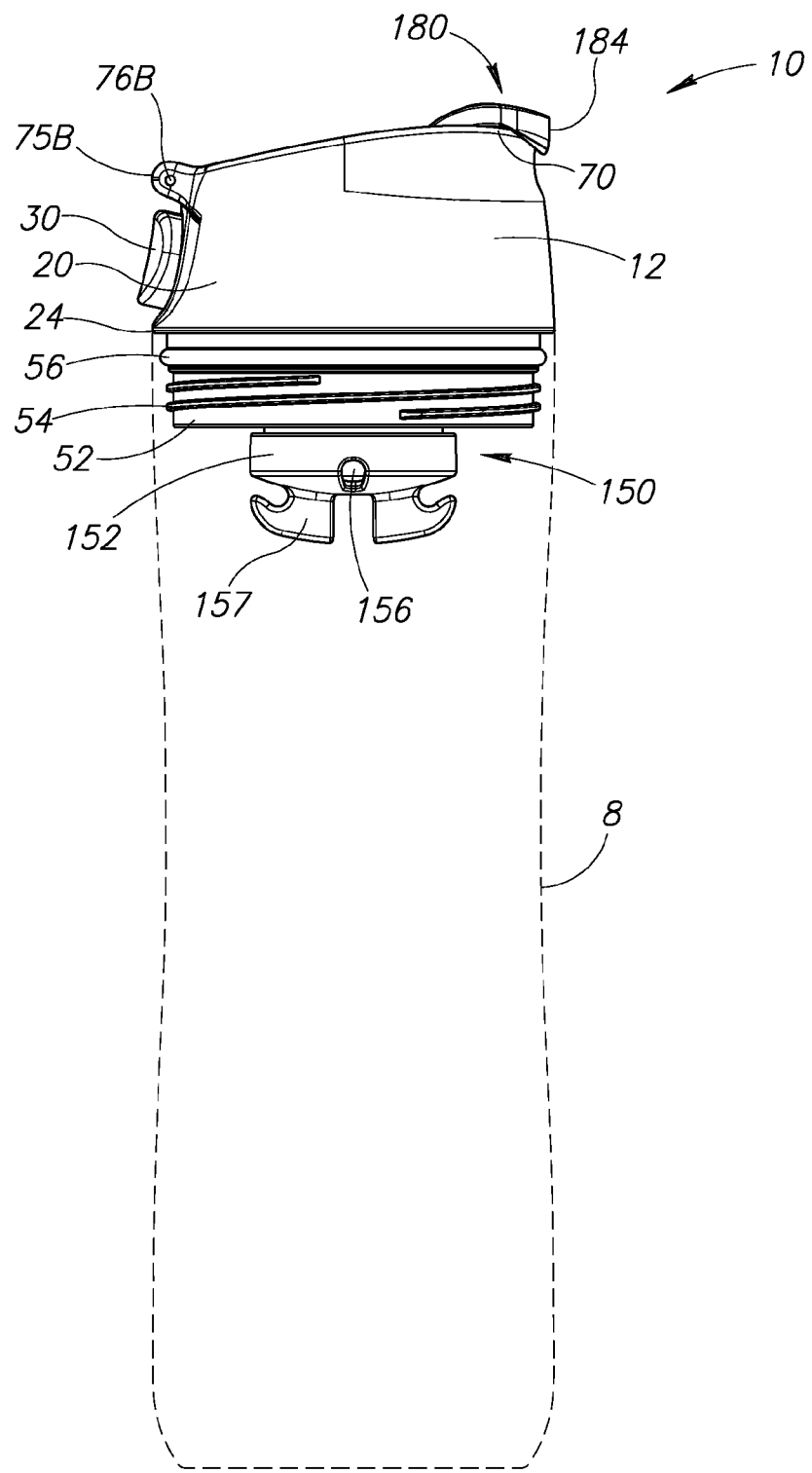
FIG. 4 is a left side elevational view of the beverage container closure of FIG. 1.
Figure 5:
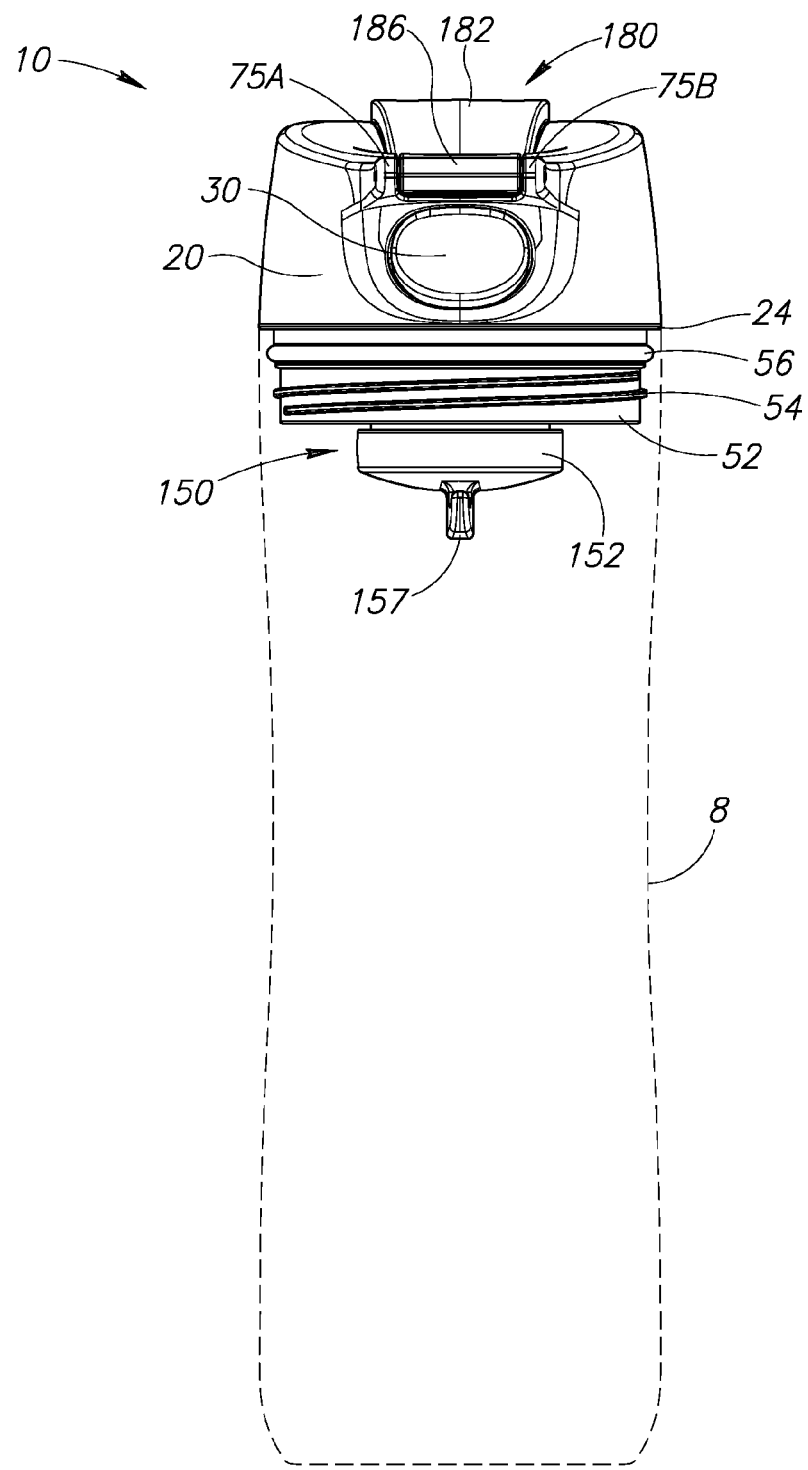
FIG. 5 is a rear elevational view of the beverage container closure of FIG. 1.
Figure 6:
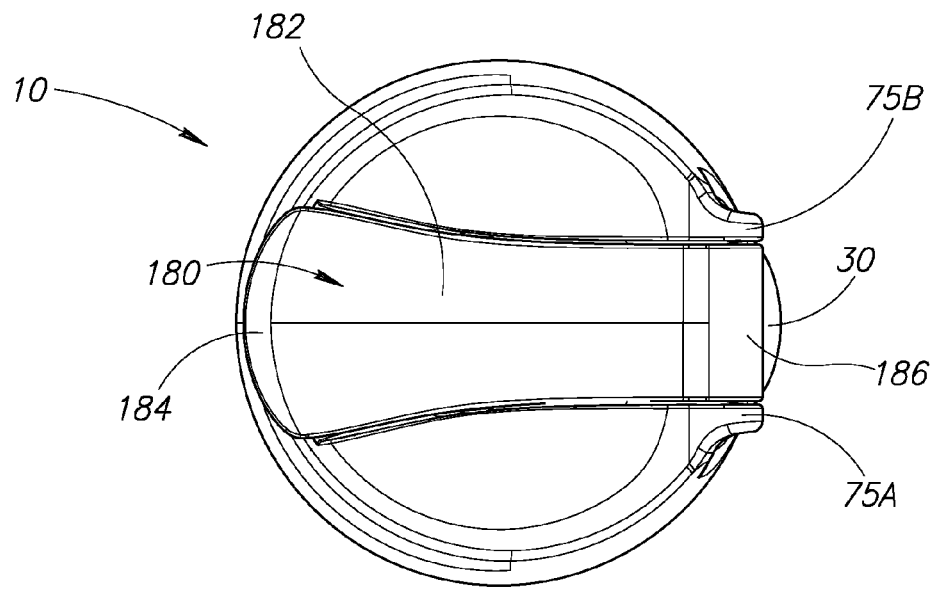
FIG. 6 is a top plan view of the beverage container closure of FIG. 1.
Figure 7:
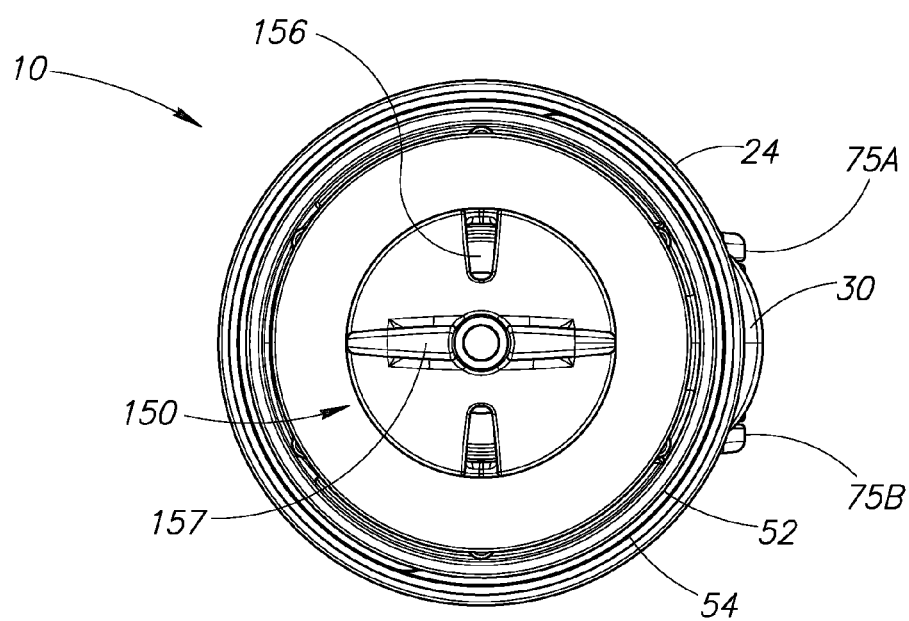
FIG. 7 is a bottom plan view of the beverage container closure of FIG. 1.

When in the cover position shown in FIGS. 1-7, the lever 180 is positioned partially within a recessed portion 63 in the lid and between inner sidewalls 71A and 71B (see FIGS. 8A and 12). Thus, when the lever 180 in the cover position, the upper-most surface of the lid 10 is formed by a right upper surface 73A, the upper surface 182 of the lever 180, and a left upper surface 73B. When in the cover position, the lever 180 is positioned over and is operative to cover the opening 64 when a user is not in the process of drinking a beverage. As shown in FIGS. 2-4, the forward portion 184 is disposed over the forward lip portion 70 when in the cover position. The inner sidewalls 71A and 71B include respective detents or recesses 67A and 67B (see FIGS. 8A and 12) configured to releasably receive corresponding protrusions 181A and 181B disposed on the lever 180. The protrusions 181A and 181B may be somewhat flexible so that they compress inward for engagement with the recesses 67A and 67B, respectively, followed by return toward their original position or shape to accomplish the interference required to latch the lever 180 to the main body 12 of the lid 10. This "snap fit" feature is useful because it allows the lever 180 to be selectively and releasably latched to the lid 10 in the cover position without requiring any screws, clips, adhesives, or other joining methods. That is, the protrusions 67A and 67B and the recesses 181A and 181B are molded into the main body 12 and the lever 180, respectively, so additional parts are not needed to join them together.

Figure 8C:
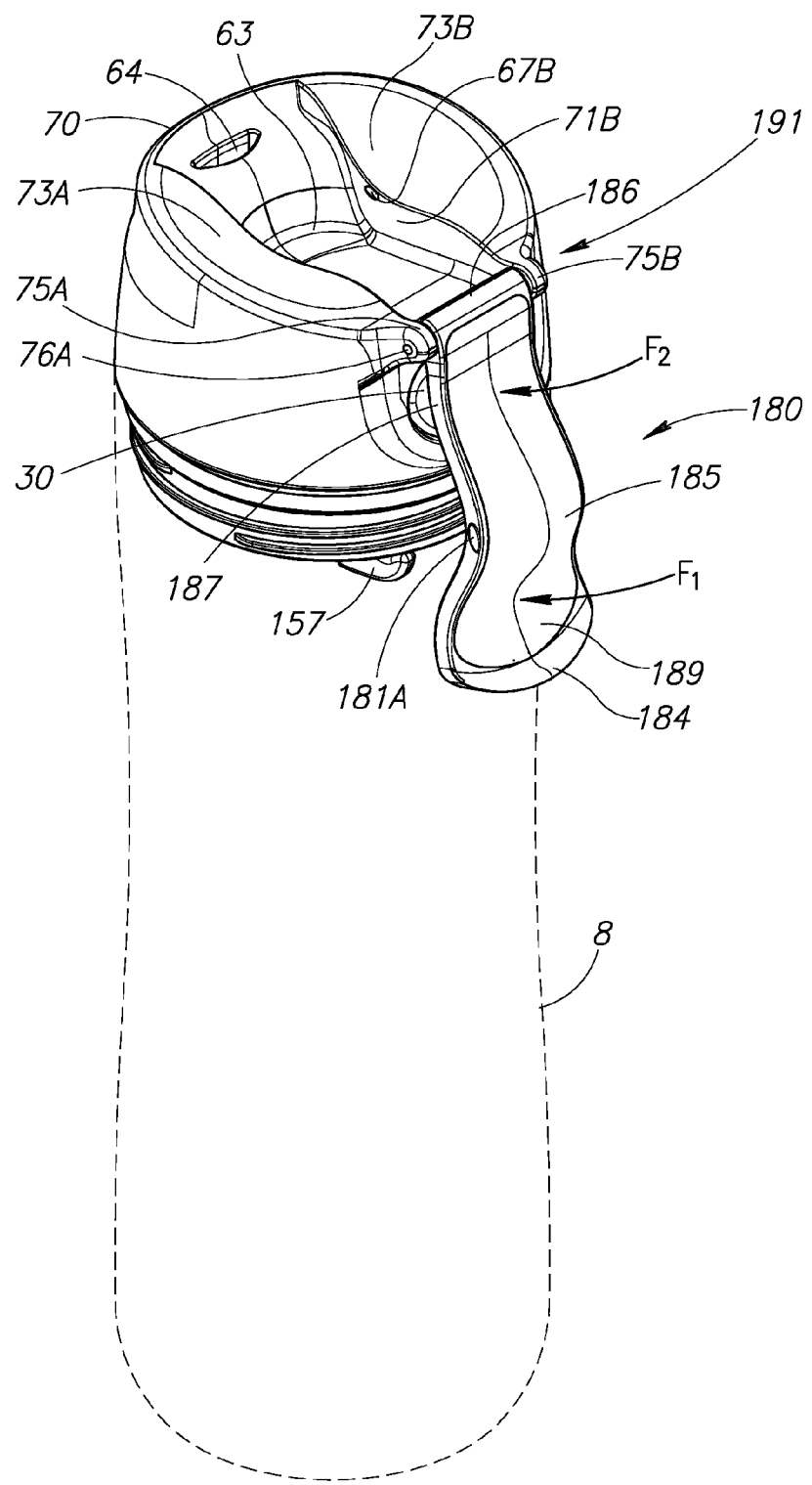
FIG. 8C is a top right side perspective view of the beverage container closure of FIG. 1 when the lever is pressed inward by a user, which causes a stopper of the beverage container closure to move into an open position.
Figure 8D:
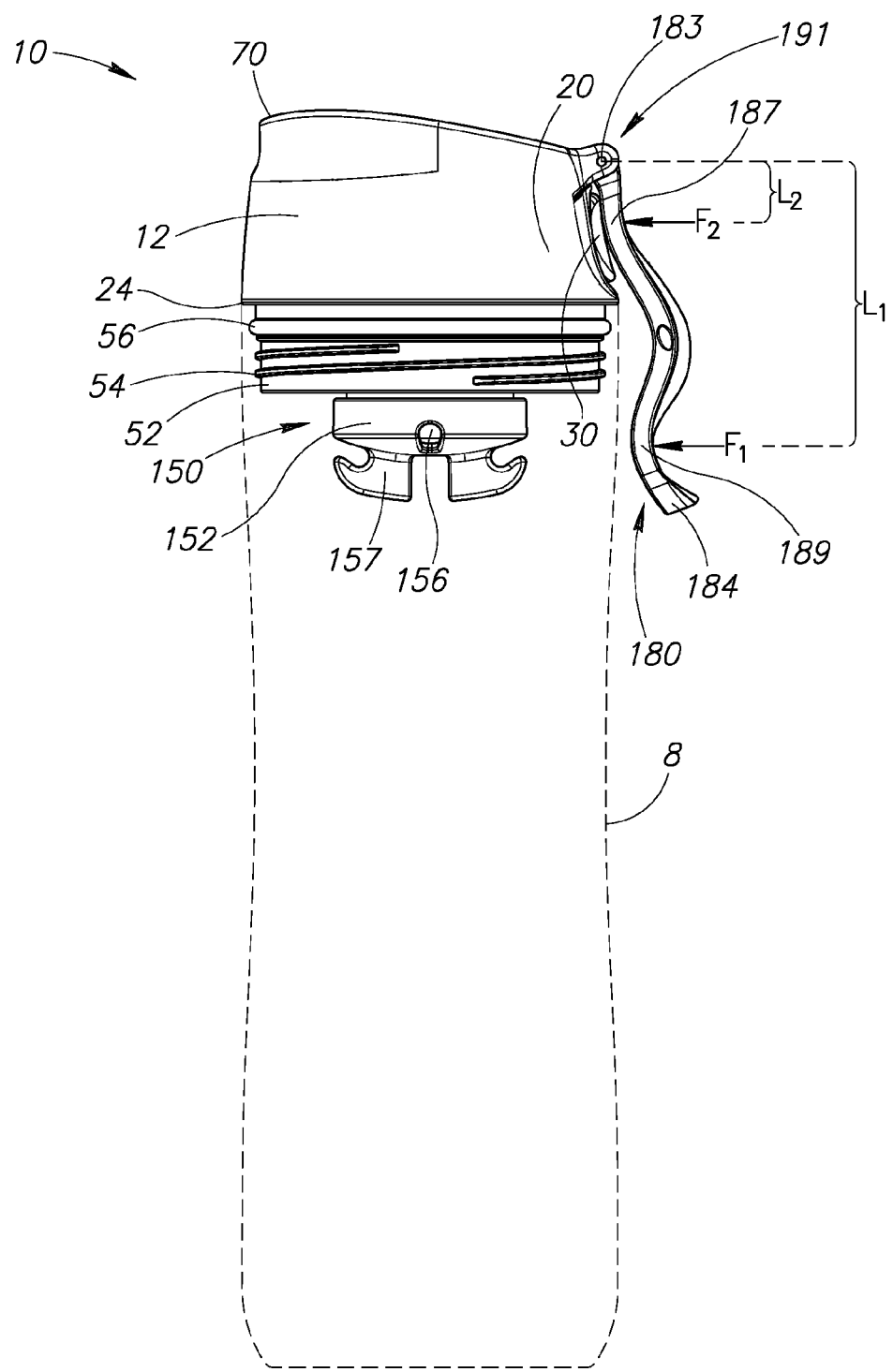
FIG. 8D is a right side elevational view of the beverage container as shown in FIG. 8C.
Figure 9:
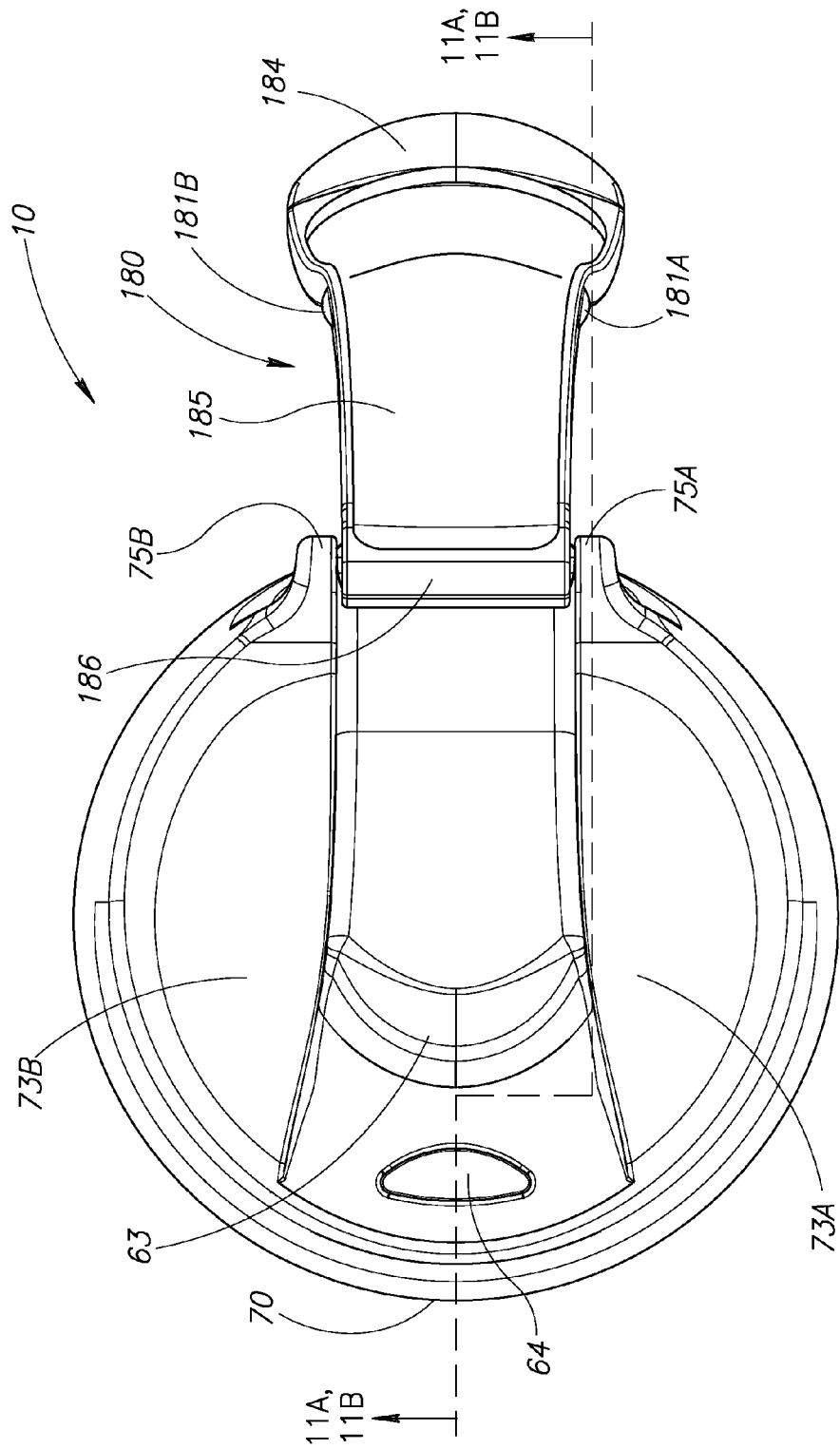
FIG. 9 is an enlarged top plan view of the beverage container closure of FIG. 8A.

In operation, a user may selectively rotate the lever 180 from the cover position (see FIGS. 8A and 8B) to the actuating position (see FIGS. 8C and 8D) wherein the lever does not cover the opening 64. In the actuating position of FIGS. 8C and 8D, the user may apply a force ($F_1$) to the lever 180 at a user force application portion 189, which causes a button contact portion 187 of the lever positioned between the pin 183 of the lid coupling portion 186 and the user force application portion to apply a laterally inward force ($F_2$) to move the button 30 laterally inward so that the user may operate the lid 10 to drink a beverage or other fluid housed in the container 8 to which the lid is attached. This position is depicted in FIGS. 8C and 8D, which show that a user applies the force ($F_1$) to the force application portion 189 to move the lever 180 laterally inward toward the body of the beverage container 8. Since the force application portion 189 of the lever 180 is positioned at a location where a user would normally hold the beverage container 8, the user can easily operate the lever by using a finger to "squeeze" the lever toward the beverage container.

As shown in FIG. 8D, the lever 180 provides a mechanical advantage that enables the user to actuate the stopper 110 using less force than is required by directly depressing the button 30. The hinge 191 and the lever 180 form a "Class 2 lever" that amplifies the force ($F_1$) applied by the user at the user force application portion 189 into the force ($F_2$) applied to the button 30 at the button contact portion 187. As will be appreciated, this occurs because the distance ($L_1$) between the user force application portion 189 of the lever 180 and the pin 183 of the hinge 191 is greater than the distance ($L_2$) between the button contact portion 187 and the hinge pin. More specifically, the mechanical advantage (MA) provided by the lever 180 is approximately equal to the length ($L_1$) divided by the length ($L_2$), or $MA=L_1/L_2$. In the illustrated embodiment, the lever 180 is configured such that the force ($F_2$) applied to the button 30 is approximately four times greater than the force ($F_1$) applied by the user (i.e., $L_1 \approx 4L_2$). As discussed above, this feature is especially advantageous for users that are not able or do not wish to use a relatively large amount of force to open the stopper 110 of the beverage container closure 10.

Venting Mechanism

As discussed above, when a hot liquid (e.g., coffee, tea, etc.) is stored in the beverage container 8 with the lid 10 secured thereto so that a seal is formed between the interior of the beverage container and the exterior environment, the pressure inside the beverage container may build. Due to this pressure, there is a potential for hot liquid or gas to spray or otherwise be expelled from the drinking opening 64 in the lid 10 when it is opened by a user (e.g., when drinking from the beverage container 8). To prevent this, in some embodiments, the vent seal 28, the button tunnel 25, the actuating member 130, and the stopper 110 are configured to together provide a venting mechanism (referenced generally by the numeral 200 in FIG. 13B) that prevents the spray of liquid or gas from the drinking opening 64 of the lid 10 when the lid is opened by a user.

Figure 13A:
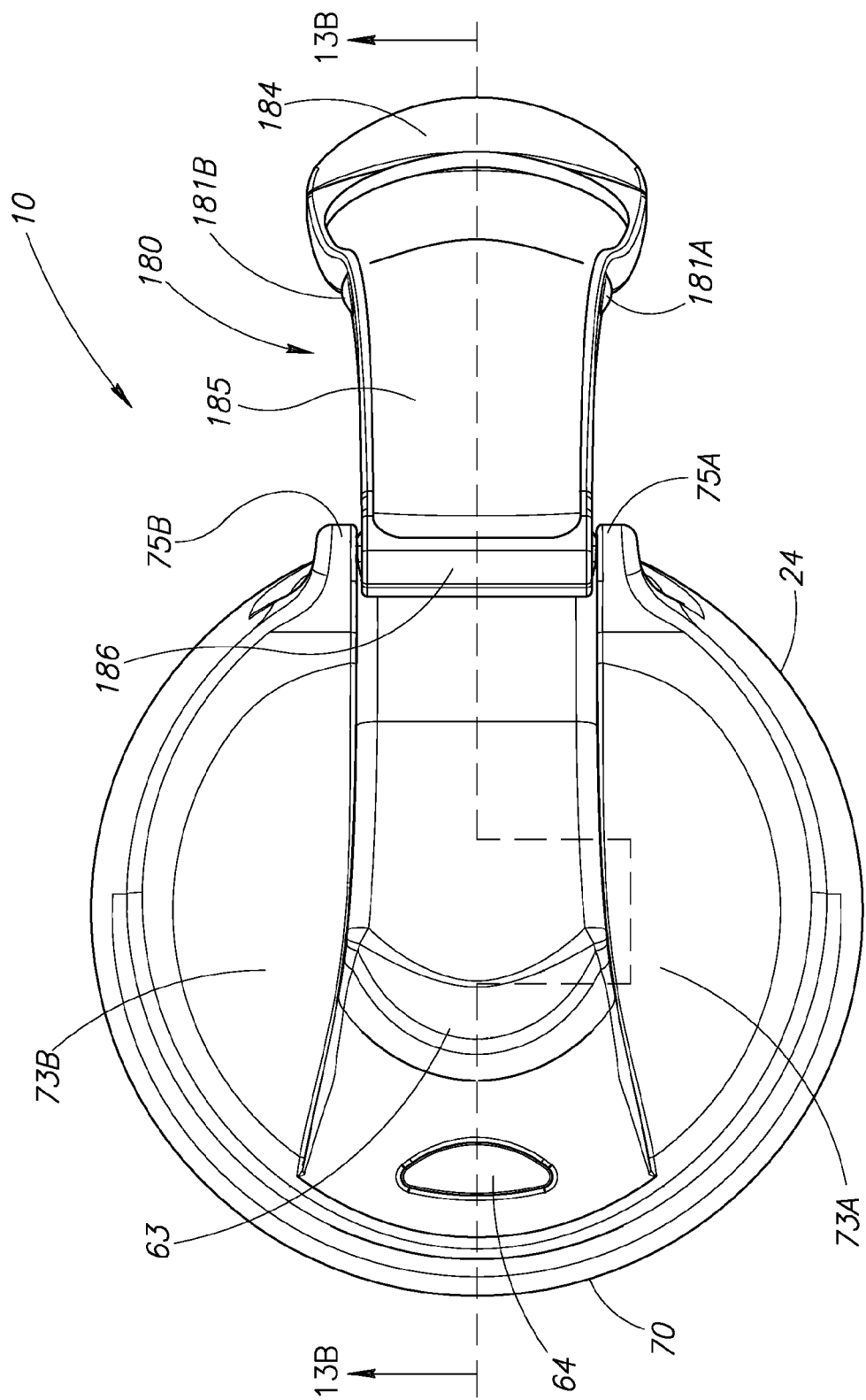
FIG. 13A is an enlarged top plan view of the beverage container closure of FIG. 8A.
Figure 13B:
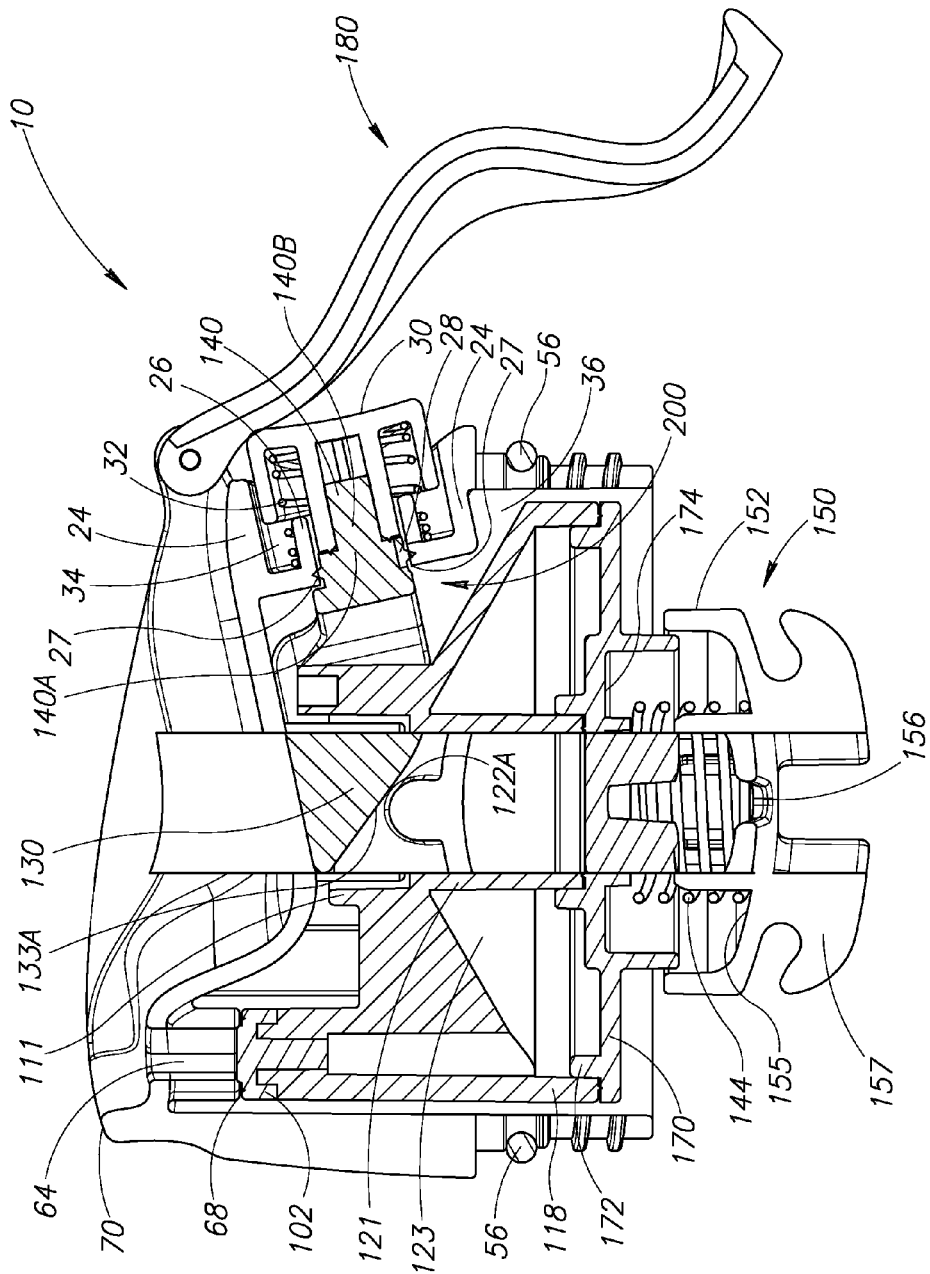
FIG. 13B is a sectional view taken substantially along the line 13B-13B of FIG. 13A with no force being applied to the lever so that the stopper and a vent seal of the beverage container closure are in a sealed position.
Figure 13C:
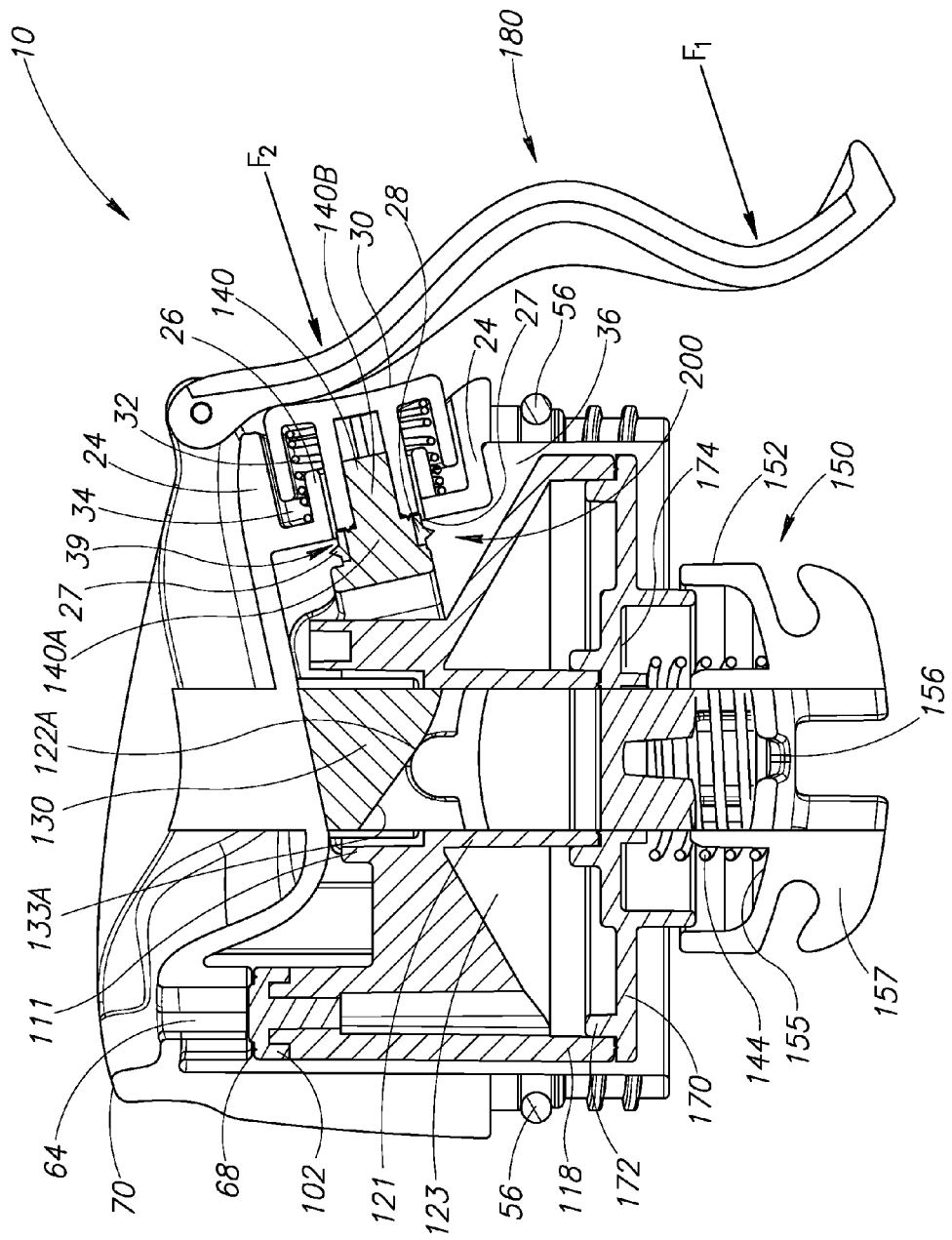
FIG. 13C is a sectional view taken substantially along the line 13B-13B of FIG. 13A when a user has begun applying a force to the lever sufficient to move vent seal into an open position but the stopper remains in the sealed position.
Figure 13D:
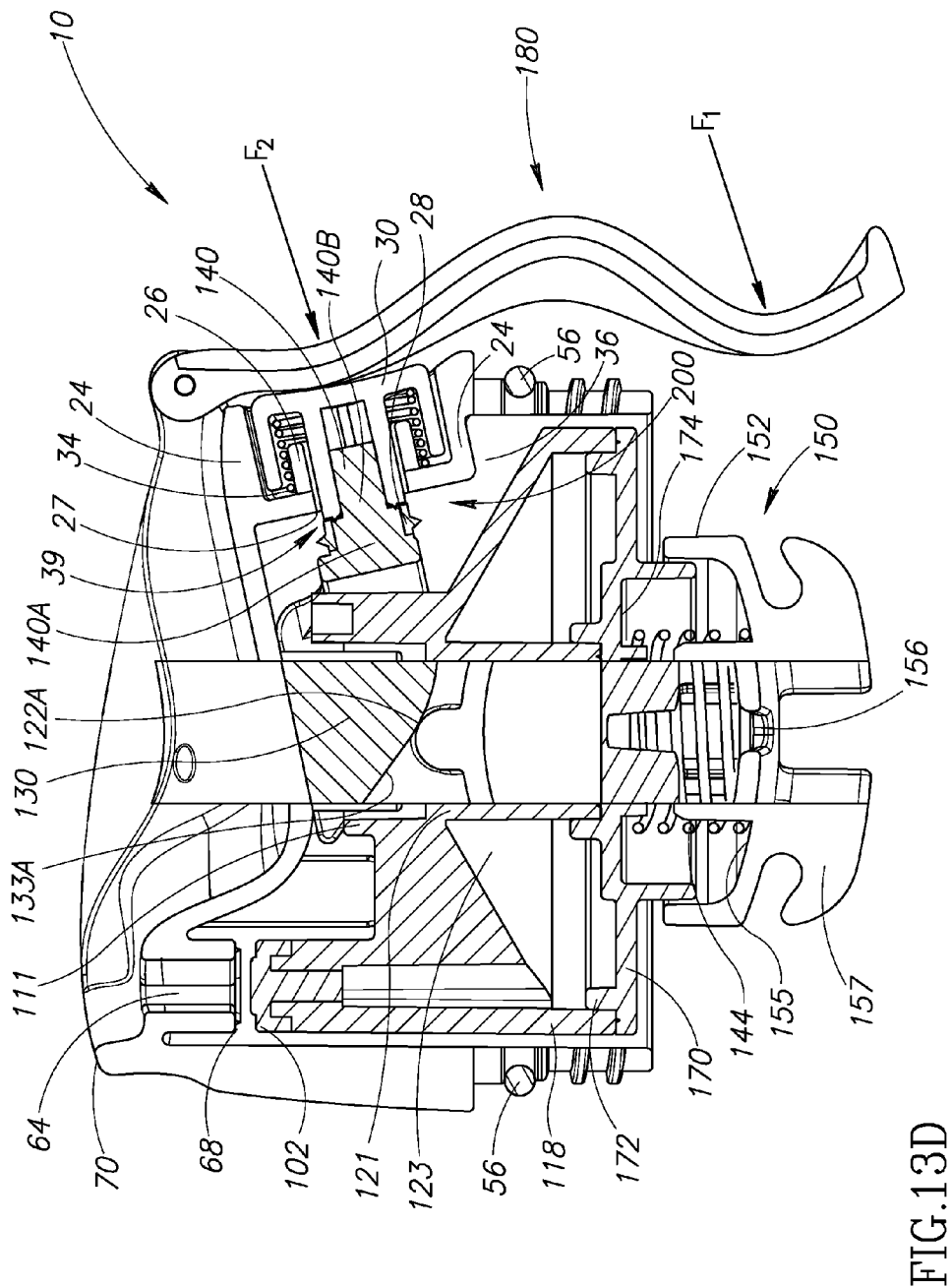
FIG. 13D is a sectional view taken substantially along the line 13B-13B of FIG. 13A when a user has applied a force to the lever sufficient to move the stopper and the vent seal into an open position as shown in FIGS. 8C and 8D.

The operation of the venting mechanism 200 is now described with reference to FIGS. 13B, 13C, and 13D, which show sectional views of the lid 10 taken substantially along the line 13B-13B of FIG. 13A, when the button 30 is not depressed by a user applying a force to the lever 180 (FIG. 13B), when the button is partially depressed (FIG. 13C), and when the button is fully depressed (FIG. 13D). In FIG. 13B, the vent seal 28 and the stopper 110 are both in a sealed position. In FIG. 13C, the vent seal 28 is in a venting or open position, and the stopper 110 remains in the sealed position. In FIG. 13D, the vent seal 28 and the stopper 110 are both in the open position.

As shown in FIG. 13B, when the button 30 is not being depressed by the lever 180, the stopper seal 102 is in contact with the stopper seal engagement portion 68 that defines the drinking opening 64 of the main body 12. In this regard, when the stopper 100 is in the closed position shown in FIG. 13B, the stopper seal 102 is pressed against the stopper seal engagement portion 68 of the main body 12 by the biasing member 144 to provide a fluid-tight seal between the container 8 to which the lid 10 is attached and the environment. Further, the vent seal 28 is disposed around the base portion 140A of the rod 140 and outward of an innermost edge 27 of the circumferential wall 26, such that it is positioned inside the button tunnel 25 to provide a fluid-tight seal between the environment and the hollow interior region 36 of the main body 12.

FIG. 13C depicts the lid 10 when the button 30 is partially depressed. As can be appreciated, the button 30 may be moved into this partially depressed position of FIG. 13C as a user moves the lever 180 between the non-depressed position shown in FIG. 13B and the fully depressed position shown in FIG. 13D. In this partially depressed position, the vent seal 28 has been displaced inward by a sufficient amount so that it is positioned inward of the edge 27 of the circumferential wall 26, outside the button tunnel 25, such that an air gap 39 is formed that allows for the passage of air between the outer environment and the hollow interior portion 36 of the main body 12.

It is noted that the actuating member 130 is configured such that the first and second cam surfaces 133A and 133B are aligned over the surfaces surface 122A of the cam follower 119A and the surface 122B of the cam follower 119B of the first and second cam follower 119A and 119B, respectively, in a manner such that the first and second cam surfaces do not engage the first and second cam follower surfaces, respectively, to move the stopper 110 in a downward direction until the button 30 has been moved inward sufficiently for the vent seal 28 to exit the button tunnel 25 and for the air gap 39 to be formed. Thus, during operation when a user depresses the lever 180 to move the button 30 inward, the vent seal 28 is opened before the drinking opening 64 is opened. Accordingly, any pressure that has built up within the beverage container 8 will be released through the air gap 39 when the user depresses the lever 180. This configuration prevents the possibility of air or liquid being expelled or sprayed out of the drinking opening 64, since the drinking opening is only opened after the air gap 39 has formed and the pressure within the container has equalized.

FIG. 13D illustrates the condition when a user has fully depressed the lever 180, which causes the actuating member 130 to be displaced even further than shown in FIG. 13C in an inward, substantially horizontal direction. As the actuating member 130 is displaced, the first and second cam surfaces 133A and 133B of the actuating member 130 slidably engage the surfaces 122A and 122B of the first and second cam followers 119A and 119B, respectively, as described above. As the stopper 110 is moved in a downward direction, the gap 38 is formed between the stopper seal 102 and the stopper seal engagement portion 68 of the main body 12 such that fluid may pass through the drinking opening 64 when the beverage container 8 is tilted. As shown, the air gap 39 is also present when the button 30 is in the fully depressed position shown in FIG. 13D. In additional to providing venting capability immediately when the lid 10 is first opened by a user, the air gap 39 also allows fluid to pass through the drinking opening 64 more freely as the user drinks from the beverage container 8.

As can be appreciated, the assembly described above may be disassembled by a user for cleaning if desired. As may best be viewed in FIGS. 10 and 12, a user may simply unscrew the stopper cover 150 from the stopper cover engagement portion 22 of the main body 12 using the handles 157, which will release the stopper 110 and the stopper cap 170, the stopper cover 150, and the stopper biasing member 144 from the hollow interior region 36 of the main body. Once these components have been cleaned, the user may then reassemble the lid 10 by first inserting the stopper 110 back into the hollow interior region 36 of the main body 12. Then, the user may position the stopper-biasing member 144 over the rod 161 of the stopper cover 150, and threadably connect the engagement portion 162 of the stopper cover with the stopper cover engagement portion 22 of the main body 12, thereby securing the stopper 110 within the hollow interior portion 36 of the main body.

Further, since both the actuating member 130 and the stopper 110 are biased by the button-biasing member 32 and the stopper-biasing member 144, respectively, the stopper 110 automatically returns to the sealed or closed position (shown in FIG. 13B) once the user removes pressure from the lever 180. In this regard, the user may open and drink from the beverage container 8 shown in FIG. 1 to which the lid 10 is attached using one hand by simply pressing the lever 180 inward with a finger of the hand holding the container while consuming a beverage and releasing the lever thereafter to automatically reseal the container. As can be appreciated, the ability to open, drink from, and close a container using only one hand may be desirable for various active users including bicyclists, hikers, drivers, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A lid for use with a drinking vessel containing a liquid, comprising:
   a main body selectively couplable to the drinking vessel, the main body including an upper portion having a drinking opening configured to permit fluid passage therethrough when the lid is coupled to the drinking vessel;
   a stopper movably coupled to the main body and configured for upward displacement into a closed position wherein the stopper engages a portion of the main body and covers the drinking opening to prevent fluid passage therethrough, and downward displacement into an opened position wherein the stopper is spaced apart from the portion of the main body to allow fluid passage through the drinking opening, the stopper having a first cam follower;
   an actuating member movably coupled to the main body and slidably engaged with the stopper, the actuating member being movable inward and outward, and having a first cam surface, the first cam follower of the stopper being positioned to engage the first cam surface of the actuating member during inward movement of the actuating member to cause the first cam surface to move the first cam follower downward which moves the stopper to the opened position, and being positioned such that during outward movement of the actuating member the first cam surface permits the first cam follower to move upward which moves the stopper to the closed position; and
   a lever rotatably coupled to the main body and configured for rotatable displacement wherein, when a first force is applied to the lever, the lever is operative to apply a second force to the actuating member to cause the actuating member to move inward, the lever being configured for rotatable displacement into a cover position wherein the lever covers the drinking opening.

2. The lid of claim 1, wherein the lever is coupled to an upper portion of the main body at a location opposite a forward lip portion of the main body and a forward portion of the lever covers the forward lip portion when the lever is in the cover position.

3. The lid of claim 1, wherein the lever is configured to be releasably secured in the cover position.

4. The lid of claim 1, wherein the lever is coupled to the main body by a hinge and is configured to receive the first force at a first portion of the lever spaced apart from the hinge and is configured to apply the second force to the actuating member at a second portion of the lever positioned between the hinge and the first portion.

5. The lid of claim 1, wherein the first portion is positioned relative to the second portion such that the second force is greater than the first force.

6. The lid of claim 1, further comprising:
a button disposed on a sidewall portion of the main body, the button being coupled to the actuating member such that pressing on the button moves the actuating member inward, wherein the lever is configured to apply the second force to the button when the first force is applied to the lever.

7. The lid of claim 1, further comprising:
a stopper biasing member coupled to the stopper and configured to bias the stopper upward into the closed position in response to outward movement of the actuating member; and
an actuating member biasing member operatively coupled to the actuating member and configured to bias the actuating member to move outward and allow the stopper biasing member to move the stopper upward into the closed position.

8. A drinking vessel and lid assembly, comprising:
a drinking vessel; and
a lid comprising:
a main body selectively couplable to the drinking vessel, the main body including an upper portion having a drinking opening configured to permit fluid passage therethrough when the lid is coupled to the drinking vessel;
a stopper movably coupled to the main body and configured for upward displacement into a closed position wherein the stopper engages a portion of the main body and covers the drinking opening to prevent fluid passage therethrough, and downward displacement into an opened position wherein the stopper is spaced apart from the portion of the main body to allow fluid passage through the drinking opening, the stopper having a first cam follower;
an actuating member movably coupled to the main body and slidably engaged with the stopper, the actuating member being movable inward and outward, and having a first cam surface, the first cam follower of the stopper being positioned to engage the first cam surface of the actuating member during inward movement of the actuating member to cause the first cam surface to move the first cam follower downward which moves the stopper to the opened position, and being positioned such that during outward movement of the actuating member the first cam surface permits the first cam follower to move upward which moves the stopper to the closed position; and
a lever rotatably coupled to the main body and configured for rotatable displacement into a cover position wherein the lever covers the drinking opening, and an actuating position wherein, when a first force is applied to the lever, the lever is operative to apply a second force to the actuating member to cause the actuating member to move inward.

9. The drinking vessel and lid assembly of claim 8, wherein the lever is configured to be releasably secured in the cover position.

10. The drinking vessel and lid assembly of claim 8, wherein the lever is coupled to the main body by a hinge and is configured to receive the first force at a first portion of the lever spaced apart from the hinge and is configured to apply the second force to the actuating member at a second portion of the lever positioned between the hinge and the first portion.

11. The drinking vessel and lid assembly of claim 8, wherein the first portion is positioned relative to the second portion such that the second force is greater than the first force.

12. The drinking vessel and lid assembly of claim 8, further comprising:
a button disposed on a sidewall portion of the main body, the button being coupled to the actuating member such that pressing on the button moves the actuating member inward, wherein the lever is configured to apply the second force to the button when in the actuating position and the first force is applied to the lever.

13. A lid for use with a drinking vessel containing a liquid, comprising:
a main body selectively couplable to the drinking vessel, the main body including an upper portion having a drinking opening configured to permit fluid passage therethrough when the lid is coupled to the drinking vessel, the main body further including a sidewall having an actuating member opening formed by an actuating member opening wall that extends through the sidewall;
a stopper movably coupled to the main body and configured for upward displacement into a closed position wherein the stopper engages a portion of the main body and covers the drinking opening to prevent fluid passage therethrough, and downward displacement into an opened position wherein the stopper is spaced apart from the portion of the main body to allow fluid passage through the drinking opening, the stopper having a cam follower;
an actuating member extending through the actuating member opening, the actuating member being movably coupled to the main body, the actuating member being movable inward and outward, and having a cam surface positioned to slidably engage the cam follower of the stopper during inward movement of the actuating member to cause the cam surface to move the cam follower downward which moves the stopper to the opened position, and being positioned such that during outward movement of the actuating member the cam surface permits the cam follower to move upward which moves the stopper to the closed position;
a seal member coupled to the actuating member and positioned within the actuating member opening between the actuating member and the actuating member opening wall when the actuating member is disposed in an outward position to provide a fluid-tight seal that prevents fluid passage through the actuating member opening, and as the actuating member is moved inward the seal member moves inward to a position at least partially out of the actuating member opening to break the fluid-tight seal prior to the cam surface moving the cam follower downward which moves the stopper to the opened position; and a lever rotatably coupled to the main body and configured for rotatable displacement into a cover position wherein the lever covers the drinking opening, and an actuating position wherein, when a first force is applied to the lever, the lever is operative to apply a second force to the actuating member to cause the actuating member to move inward.

14. The lid of claim 13, wherein the actuating member is biased toward the outward position and the stopper is biased toward the closed position.

15. The lid of claim 13, further comprising:
a button disposed on the sidewall of the main body, the button being coupled to the actuating member such that pressing on the button moves the actuating member inward, wherein the lever is configured to apply the second force to the button when in the actuating position and the first force is applied to the lever.

16. A lid for use with a drinking vessel containing a liquid, comprising:
a main body selectively couplable to the drinking vessel, the main body including an upper portion having an opening configured to permit fluid passage therethrough when the lid is coupled to the drinking vessel;
a stopper movably coupled to the main body and configured for upward displacement into a closed position wherein the stopper engages a portion of the main body and covers the opening to prevent fluid passage therethrough, and downward displacement into an opened position wherein the stopper is spaced apart from the portion of the main body to allow fluid passage through the opening, the stopper having an actuating member engagement portion comprising one of a cam surface and a cam follower;
an actuating member movably coupled to the main body and slidably engaged with the stopper, the actuating member being movable inward and outward, and having a stopper engagement portion comprising the other of the cam surface and the cam follower, the actuating member engagement portion of the stopper being positioned to engage the stopper engagement portion of the actuating member during inward movement of the actuating member to cause the stopper engagement portion to move the actuating member engagement portion downward which moves the stopper to the opened position, and being positioned such that during outward movement of the actuating member the stopper engagement portion permits the actuating member engagement portion to move upward which moves the stopper to the closed position; and
a lever rotatably coupled to the main body and configured for rotatable displacement into a cover position wherein the lever covers the drinking opening, and an actuating position wherein, when a first force is applied to the lever, the lever is operative to apply a second force to the actuating member to cause the actuating member to move inward.

17. A lid for use with a drinking vessel containing a liquid, comprising:
a main body selectively couplable to the drinking vessel, the main body including an upper portion having a drinking opening configured to permit fluid passage therethrough when the lid is coupled to the drinking vessel, the main body further including a sidewall having an actuating member opening formed by an actuating member opening wall that extends through the sidewall;
a stopper movably coupled to the main body and configured for upward displacement into a closed position wherein the stopper engages a portion of the main body and covers the drinking opening to prevent fluid passage therethrough, and downward displacement into an opened position wherein the stopper is spaced apart from the portion of the main body to allow fluid passage through the drinking opening, the stopper having first and second cam followers spaced apart from each other;
an actuating member extending through the actuating member opening, the actuating member being movably coupled to the main body, the actuating member being movable inward and outward, and having first and second cam surfaces spaced apart from each other, the first and second cam followers of the stopper being positioned to be slidably engaged by the first and second cam surfaces of the actuating member, respectively, during inward movement of the actuating member to move the first and second cam followers downward which moves the stopper to the opened position, and being positioned such that during outward movement of the actuating member the first and second cam surfaces permit the first and second cam followers to move upward which moves the stopper to the closed position;
a seal member coupled to the actuating member and positioned within the actuating member opening between the actuating member and the actuating member opening wall when the actuating member is disposed in an outward position to provide a fluid-tight seal that prevents fluid passage through the actuating member opening, and as the actuating member is moved inward the seal member moves inward to a position at least partially out of the actuating member opening to break the fluid-tight seal prior to the first and second cam surfaces moving the first and second cam followers downward which moves the stopper to the opened position; and
a lever rotatably coupled to the main body and configured for rotatable displacement into a cover position wherein the lever covers the drinking opening, and an actuating position wherein, when a first force is applied to the lever, the lever is operative to apply a second force to the actuating member to cause the actuating member to move inward.

18. A lid for use with a drinking vessel containing a liquid, comprising:
a main body selectively couplable to the drinking vessel, the main body including an upper portion having a drinking opening configured to permit fluid passage therethrough when the lid is coupled to the drinking vessel, the main body further including a sidewall having an actuating member opening formed by an actuating member opening wall that extends through the sidewall;
a stopper movably coupled to the main body and configured for upward displacement into a closed position wherein the stopper engages a portion of the main body and covers the drinking opening to prevent fluid passage therethrough, and downward displacement into an opened position wherein the stopper is spaced apart from the portion of the main body to allow fluid passage through the drinking opening, the stopper having a stopper engagement portion comprising one of a cam surface and a cam follower;
an actuating member extending through the actuating member opening, the actuating member being movably coupled to the main body, the actuating member being movable inward and outward, and having an actuating member engagement portion comprising the other of the cam surface and the cam follower, the actuating member engagement portion of the actuating member being positioned to slidably engage the stopper engagement portion of the stopper during inward movement of the actuating member to cause the actuating member engagement portion to move the stopper engagement portion downward which moves the stopper to the opened position, and being positioned such that during outward movement of the actuating member the actuating member engagement portion permits the stopper engagement portion to move upward which moves the stopper to the closed position;

a seal member coupled to the actuating member and positioned within the actuating member opening between the actuating member and the actuating member opening wall when the actuating member is disposed in an outward position to provide a fluid-tight seal that prevents fluid passage through the actuating member opening, and as the actuating member is moved inward, the seal member moves inward to a position whereat the fluid-tight seal between the seal member and the actuating member opening wall is broken prior to the actuating member engagement portion moving the stopper engagement portion downward sufficiently to move the stopper to the opened position; and a lever rotatably coupled to the main body and configured for rotatable displacement into a cover position wherein the lever covers the drinking opening, and an actuating position wherein, when a first force is applied to the lever, the lever is operative to apply a second force to the actuating member to cause the actuating member to move inward.

19. A lid for use with a drinking vessel containing a liquid, comprising:

a main body selectively couplable to the drinking vessel, the main body including an upper portion having a drinking opening configured to permit fluid passage therethrough when the lid is coupled to the drinking vessel;

a stopper movably coupled to the main body and configured for displacement in a first direction into a closed position wherein the stopper engages a portion of the main body and covers the drinking opening to prevent fluid passage therethrough, and displacement in a second direction into an opened position wherein the stopper is spaced apart from the portion of the main body to allow fluid passage through the drinking opening;

an actuating member movably coupled to the main body and engaged with the stopper, the actuating member being configured such that its movement causes the stopper to move between the opened position and the closed position; and a lever rotatably coupled to the main body and configured for rotatable displacement wherein, when a first force is applied to the lever, the lever is operative to apply a second force to the actuating member to cause the actuating member to move in a direction that causes the stopper to move toward the opened position, the lever being configured for rotatable displacement into a cover position wherein the lever covers the drinking opening.

20. The lid of claim 19, wherein the lever is coupled to the main body by a hinge and is configured to receive the first force at a first portion of the lever spaced apart from the hinge and is configured to apply the second force to the actuating member at a second portion of the lever positioned between the hinge and the first portion.

* * * * *